US009348016B2

(12) United States Patent
Asanuma

(10) Patent No.: US 9,348,016 B2
(45) Date of Patent: May 24, 2016

(54) RADAR APPARATUS AND SIGNAL PROCESSING METHOD

(71) Applicant: FUJITSU TEN LIMITED, Kobe-shi, Hyogo (JP)

(72) Inventor: Hisateru Asanuma, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 289 days.

(21) Appl. No.: 14/060,255

(22) Filed: Oct. 22, 2013

(65) Prior Publication Data

US 2014/0145871 A1  May 29, 2014

(30) Foreign Application Priority Data

Nov. 28, 2012  (JP) ................................ 2012-259296

(51) Int. Cl.
| | | |
|---|---|---|
| G01S 7/35 | (2006.01) | |
| G01S 13/34 | (2006.01) | |
| G01S 13/93 | (2006.01) | |
| G01S 13/72 | (2006.01) | |

(52) U.S. Cl.
CPC .............. *G01S 7/354* (2013.01); *G01S 13/345* (2013.01); *G01S 13/723* (2013.01); *G01S 13/931* (2013.01); *G01S 2007/356* (2013.01)

(58) Field of Classification Search
CPC ..... G01S 7/354; G01S 13/723; G01S 13/931; G01S 13/345; G01S 2007/356
USPC ............. 342/128, 133, 139, 146–147, 70–72, 342/192, 195–196
See application file for complete search history.

(56) References Cited

U.S. PATENT DOCUMENTS

| | | | | | |
|---|---|---|---|---|---|
| 5,751,240 | A * | 5/1998 | Fujita | ....................... | G01S 13/34 342/107 |
| 9,194,940 | B2 * | 11/2015 | Asanuma | .................. | G01S 3/74 |
| 2008/0224918 | A1 * | 9/2008 | Shimizu | ................ | G01S 7/4026 342/147 |
| 2009/0237292 | A1 * | 9/2009 | Tigrek | .................... | G01S 13/28 342/109 |
| 2009/0303105 | A1 * | 12/2009 | Ando | .................. | G01S 13/4463 342/123 |
| 2010/0033365 | A1 * | 2/2010 | Kishida | ................... | G01S 13/42 342/70 |
| 2011/0122013 | A1 * | 5/2011 | Takeya | .................. | G01S 13/584 342/109 |
| 2012/0050091 | A1 * | 3/2012 | Inami | ................... | H01Q 21/061 342/107 |
| 2012/0268314 | A1 * | 10/2012 | Kuwahara | ................. | G01S 3/74 342/147 |
| 2013/0093613 | A1 * | 4/2013 | Itoh | ....................... | G01S 13/345 342/70 |
| 2014/0145871 | A1 * | 5/2014 | Asanuma | ................ | G01S 7/354 342/128 |

FOREIGN PATENT DOCUMENTS

JP    A-2002-122662    4/2002

* cited by examiner

*Primary Examiner* — John B Sotomayor
(74) *Attorney, Agent, or Firm* — Oliff PLC

(57) ABSTRACT

There is provided a radar apparatus configured to emit a transmission wave, to receive a reflected wave as a reception signal, and to derive target information including at least position information of a target from peak signals which are extracted by performing FFT processing for a beat signal that is generated from the reception signal. A determination unit is configured to determine whether a specific peak signal exists at a frequency that is distant from a frequency of the peak signal existing at a first frequency by a frequency of one selected peak signal selected from the plurality of peak signals. An exclusion unit is configured to exclude the target information corresponding to the selected peak signal from an output object of the radar apparatus when the specific peak signal exists.

8 Claims, 18 Drawing Sheets

RADAR APPARATUS AND SIGNAL PROCESSING METHOD

CROSS-REFERENCE TO RELATED APPLICATIONS

This application is based on and claims priority from Japanese Patent Application No. 2012-259296 filed on Nov. 28, 2012.

TECHNICAL FIELD

The invention relates to signal processing for derivation of a target.

BACKGROUND

Traditionally, a radar apparatus mounted on a vehicle emits a transmission wave from a transmission antenna and receives a reflected wave from a target, which reflects the emitted transmission wave, with a reception antenna to thus derive target information such as position information of the target relative to the vehicle (radar vehicle). The radar apparatus outputs the derived target information to a vehicle control device mounted on the vehicle. The vehicle control device having received the target information from the radar apparatus performs ACC (Adaptive Cruise Control) control of following up a preceding vehicle, which is a target moving in the same direction as the vehicle on an own traffic lane, towards the front of the vehicle. Also, as another example of the vehicle control, when there is a possibility that the vehicle will collide with an adjacent vehicle, which is moving in an opposite direction to the moving direction of the vehicle in an adjacent traffic lane adjacent to the own traffic lane, the vehicle control device performs PCS (Pre-Crash Safety System) control of emitting a warning sound to a user of the vehicle by using a warning device.

Here, when the vehicle control device performs the ACC or PCS control, the target that is to be controlled is a target that exists within a predetermined range from the vehicle (for example, 0 to 200 m from the vehicle). The information of the target that is to be controlled is derived by following processing that is executed by a signal processing unit of the radar apparatus. The signal processing unit performs FFT (Fast Fourier Transform) processing for a beat signal generated from a reception signal corresponding to the reflected wave from the target. By the FFT processing, data (which is hereinafter referred to as 'FFT data') is acquired which indicates a signal level of each frequency of the beat signal. The FFT data is data that has a level value of the beat signal at each BIN from 0 to 1023 BIN (1 BIN is about 468 Hz). The signal processing unit extracts a signal (hereinafter, referred to as 'peak signal') exceeding a predetermined signal level from the data of the frequency (0 to 700 BIN) corresponding to a distance of 0 to 200 m from the vehicle within a relative speed range of the target and derives the target information of the target on the basis of the peak signal. That is, the signal processing unit does not use data of the frequency of 701 to 1023 BIN corresponding to a distance beyond 200 m from the vehicle, as the target information for the vehicle control. Therefore, after the FFT processing, the signal processing unit deletes the data of the frequency of 701 to 1023 BIN of the acquired FFT data. In the meantime, Patent Document 1 discloses a technology relating to the invention.

Patent Document 1: Japanese Patent Application Publication No. 2002-122662A

However, when there is a strong reflector such as a truck, which is a target having a relatively high signal level of the reflected wave, at a distance (for example, about 461 m from the vehicle) corresponding to a frequency (for example, 1187 BIN) exceeding 1023 BIN, a peak signal (hereinafter, referred to as 'ghost peak') of a ghost, which is a target that does not actually exist, may be generated in the frequency range of 0 to 700 BIN of the FFT data. Specifically, due to an interference (intermodulation) between a reception signal of the strong reflector and a switching noise (for example, a noise appearing as a peak signal at the frequency of 1023 BIN) of a DC-DC converter of a power supply circuit of the radar apparatus, a ghost peak may be generated at a frequency (for example, 164 BIN) of 700 BIN or lower of the FFT data and the target information may be derived at a distance (for example, about 60 m from the vehicle) corresponding to the frequency.

As a result, the target information of the ghost peak is output from the radar apparatus to the vehicle control device and the vehicle control device performs the ACC or PCS control, so that the vehicle control may be unnecessarily performed.

SUMMARY

It is therefore an object of the invention to correctly determine whether information relating to a target is information of a ghost that does not actually exist.

(1) According to an aspect of the embodiments of the present invention, there is provided a radar apparatus configured to emit a transmission wave relating to a transmission signal to be frequency-modulated, to receive a reflected wave coming from a target at which the transmission wave is reflected as a reception signal, and to derive target information including at least position information of the target from peak signals which are extracted by performing FFT processing for a beat signal that is generated from the reception signal, the radar apparatus comprising: a determination unit configured to determine whether a specific peak signal exists at a frequency that is distant from a frequency of the peak signal existing at a first frequency by a frequency of one selected peak signal selected from the plurality of peak signals, and an exclusion unit configured to exclude the target information corresponding to the selected peak signal from an output object of the radar apparatus when the specific peak signal exists.

(2) The radar apparatus according to (1), further comprising a correction unit configured to multiply a signal level value of the specific peak signal by predetermined times in accordance with a frequency obtained by folding back the frequency of the specific peak signal with respect to a second frequency of a predetermined frequency, wherein the exclusion unit excludes the target information corresponding to the selected peak signal from the output object of the radar apparatus when a signal level value of the selected peak signal and a signal level value of the specific peak signal after correction meet a predetermined relation.

(3) The radar apparatus according to (1) or (2), further comprising an acquisition unit configured to acquire FFT data having signal level values of the beat signal of a first region which is a frequency region including a frequency up to an upper limit frequency of a peak signal corresponding to a target becoming the output object of the radar apparatus, and in a second region which is a frequency region including a frequency higher than the upper limit frequency and of a peak signal corresponding to a target excluded from the output object of the radar apparatus, and being derived by the FFT processing, wherein the determination unit determines whether the specific peak signal exists by using the FFT data.

(4) The radar apparatus according to (3), wherein the first frequency is a frequency of the second region.

(5) The radar apparatus according to (3) or (4), wherein the transmission wave is output with beam patterns that are different in one transmission period and another transmission period, and wherein the acquisition unit acquires the FFT data of only the first region in a plurality of periods corresponding to the one transmission period and the another transmission period and the FFT data corresponding to one of the one transmission period and the another transmission period.

(6) The radar apparatus according to (5), wherein the acquisition unit acquires the FFT data of a half cycle of one of the one transmission period and the another transmission period.

(7) The radar apparatus according to any one of (1) to (6), wherein when the determination unit determines in subsequent processing of a predetermined number of times including this time processing that no specific peak signal corresponding to the same target as the target excluded from the output object in previous time processing exists, the exclusion unit sets the target information corresponding to the selected peak signal as the output object of the radar apparatus.

(8) According to another aspect of the embodiments of the present invention, there is provided a signal processing method of emitting a transmission wave relating to a transmission signal to be frequency-modulated, receiving a reflected wave coming from a target at which the transmission wave is reflected as a reception signal, and deriving target information including at least position information of the target from peak signals which are extracted by performing FFT processing for a beat signal that is generated from the reception signal, the signal processing method comprising: determining from a frequency of the peak signal existing at a first frequency whether a specific peak signal exists at a frequency that is distant by a frequency of one selected peak signal selected from the plurality of peak signals, and when the specific peak signal exists, excluding the target information corresponding to the selected peak signal from an output object of the radar apparatus.

According to the aspects defined in (1) to (8), when the specific peak signal exists, the target information corresponding to the selected peak signal is excluded from the output object of the radar apparatus. Thereby, it is possible to correctly determine whether the selected peak signal is a peak signal of a ghost corresponding to a target, which does not actually exist, and to prevent the target information, which is originally not to be output, from being output from the radar apparatus.

Also, according to the aspect defined in (2), in particular, the target information corresponding to the selected peak signal is excluded from the output object of the radar apparatus when a signal level value of the selected peak signal and a signal level value of the specific peak signal after correction meet a predetermined relation. Thereby, it is possible to specify whether the selected peak signal is a peak signal of the ghost more correctly.

Also, according to the aspect defined (3), in particular, the FFT data of the second region is used to determine a ghost peak. Thereby, it is possible to effectively utilize the FFT data in all frequency regions derived by the FFT processing.

Also, according to the aspect defined in (4), in particular, the data of the second region is used together with the data of the first region. Thereby, it is possible to correctly determine whether the selected peak signal is a peak signal of the ghost.

Also, according to the aspect defined in (5), in particular, the FFT data corresponding to one of the one transmission period and another transmission period is acquired. Thereby, it is possible to reduce a storage capacity of a memory, compared to a configuration where the FFT data of the first and second regions is acquired in a plurality of transmission periods.

Also, according to the aspect defined in (6), in particular, an acquisition period of the FFT data of the first and second regions is a half cycle of the transmission period. Thereby, it is possible to reduce the storage capacity of the memory, compared to a configuration where an acquisition period of the FFT data of the first and second regions is one cycle corresponding to the transmission period.

Also, according to the aspect defined in (7), in particular, it is determined by a predetermined number of times whether the target information excluded from the output object by one time processing is target information corresponding to a peak signal of the ghost in subsequent processing. When the determination condition is not satisfied, the corresponding target information is set as the output object of the radar apparatus. Thereby, it is possible to prevent a situation where a target actually existing is regarded as a target corresponding to the peak signal of the ghost and is thus erroneously excluded from the output object.

DETAILED DESCRIPTION OF THE EMBODIMENTS

Hereinafter, illustrative embodiments of the invention will be described with reference to the drawings. The below illustrative embodiments are just exemplary and the technical scope of the invention is not limited thereto.

<First Illustrative Embodiment>
<1. Configuration>
<1-1. Vehicle Overall View>

Figure 1:
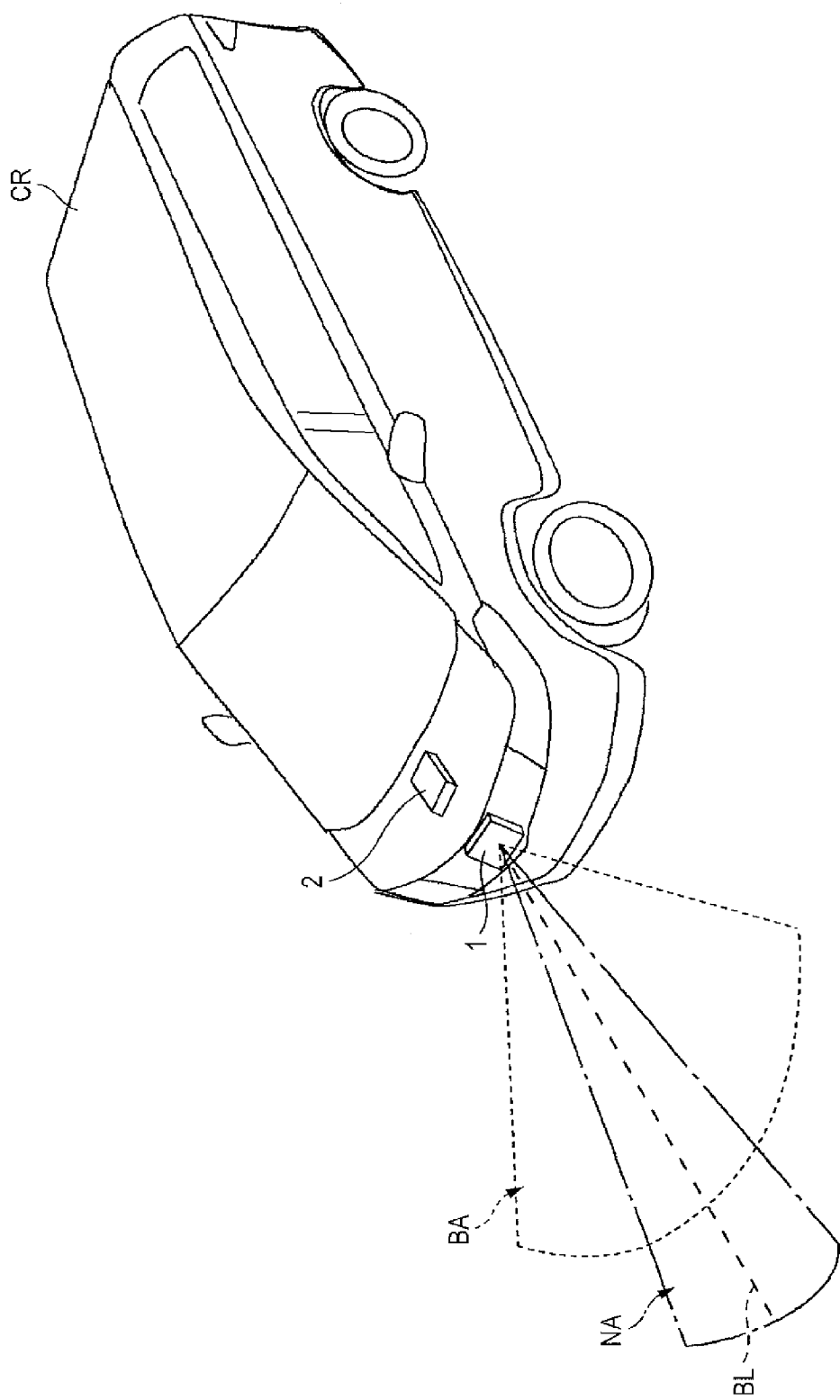
FIG. 1 is an overall view of a vehicle.

FIG. 1 is an overall view of a vehicle CR. The vehicle CR mainly has a radar apparatus 1 and a vehicle control device 2, which are included in a vehicle control system 10 of this illustrative embodiment. The vehicle CR has the radar apparatus 1 in the vicinity of a front bumper of the vehicle. The radar apparatus 1 scans a predetermined scanning scope by one scanning to thus derive a distance between the vehicle CR and a target in a vehicle traveling direction, i.e., a distance (hereinafter, referred to as a 'longitudinal distance') until a reflected wave from the target arrives at a reception antenna of the radar apparatus 1. Also, the radar apparatus 1 derives a distance between the vehicle CR and the target in a vehicle transverse direction (a vehicle width direction), i.e., a distance (hereinafter, referred to as a 'transverse distance') of the target with respect to the vehicle CR in a direction substantially orthogonal to a reference axis BL virtually extending in the traveling direction of the vehicle CR. In the meantime, the transverse distance is derived by performing a trigonometric function calculation for information on an angle of the target with respect to the vehicle CR. Like this, the radar apparatus 1 derives the position information of the target with respect to the vehicle CR. Also, the radar apparatus 1 derives a relative speed that is a speed of the target relative to a speed of the vehicle CR.

Figure 2:
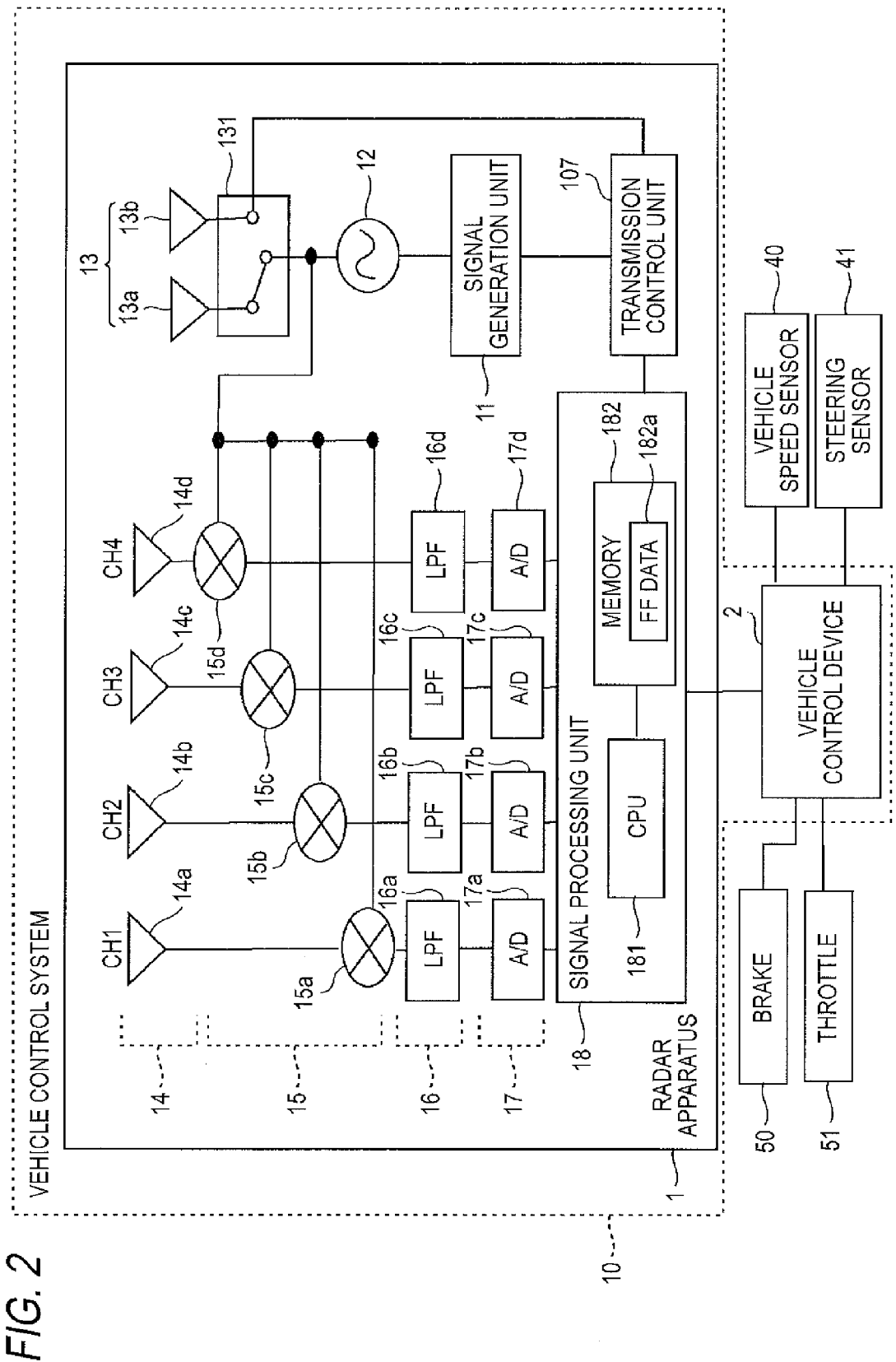
FIG. 2 is a block diagram of a vehicle control system.

In the meantime, FIG. 1 shows beam patterns of transmission waves that are transmitted from two transmission antennae (a transmission antenna 13a and a transmission antenna 13b shown in FIG. 2) of the radar apparatus 1. When the reference axis BL is ±0°, a beam pattern NA of the transmission wave output from the transmission antenna 13a has a narrower angle range (for example, ±6°) than a beam pattern NB of the transmission wave that is output from the transmission antenna 13b and is output in the shape of a relatively sharp beam pattern having a long longitudinal distance. The reason why the longitudinal distance is long is that an output level of outputting the transmission wave is relatively high.

In contrast, the beam pattern NB of the transmission wave that is output from the transmission antenna 13b has a wider angle range (for example, ±10°) than the beam pattern NA of the transmission wave that is output from the transmission antenna 13a, and is output in the shape of a relatively broad beam pattern having a short longitudinal distance. The reason why the longitudinal distance is short is that an output level of outputting the transmission wave is relatively low. In each of a transmission period in which the transmission wave is output from the transmission antenna 13a and a transmission period in which the transmission wave is output from the transmission antenna 13b, the transmission waves of different beam patterns are output, so that it is possible to prevent an error of an angle derivation, which is caused due to a phase fold-back of the reflected wave from the target. Processing of deriving a target angle will be described later.

Also, the radar apparatus 1 of FIG. 1 is mounted in the vicinity of the front bumper of the vehicle. However, the radar apparatus may be mounted to another part, for example in the vicinity of a rear bumper of the vehicle CR and in the vicinity of a side mirror of the vehicle CR without being limited to the vicinity of the front bumper, inasmuch as it is possible to derive a target in accordance with a control object of the vehicle CR of the vehicle control device 2 at the corresponding mount position.

Also, the vehicle CR has the vehicle control device 2 in the vehicle CR. The vehicle control device 2 is an ECU (Electronic Control Unit) that controls respective devices of the vehicle CR.

<1-2. System Block Diagram>

FIG. 2 is a block diagram of the vehicle control system 10. The vehicle control system 10 is configured so that the radar apparatus 1 and the vehicle control device 2 are electrically connected and the target information on the position information and the relative speed, which are usually derived from the radar apparatus 1, is output to the vehicle control device 2. That is, the radar apparatus 1 outputs the target information, which is the information on the longitudinal distance, transverse distance and relative speed of the target with respect to the vehicle CR, to the vehicle control device 2. Then, the vehicle control device 2 controls operations of the various devices of the vehicle CR, based on the target information. Also, the vehicle control device 2 of the vehicle control system 10 is electrically connected to a variety of sensors provided to the vehicle CR, such as a vehicle speed sensor 40 and a steering sensor 41. Also, the vehicle control device 2 is electrically connected to a variety of devices provided to the vehicle CR, such as a brake 50 and a throttle 51.

The radar apparatus 1 mainly has a signal generation unit 11, an oscillator 12, a transmission antenna 13, a reception antenna 14, a mixer 15, an LPF (Low Pass Filter) 16, an AD (Analog to Digital) converter 17 and a signal processing unit 18.

The signal generation unit 11 generates a modulation signal of which a voltage changes in a triangular wave shape, for example, based on a control signal of a transmission control unit 107 that will be described later.

The oscillator 12 is a voltage control oscillator that controls an oscillation frequency with a voltage, frequency-modulates a predetermined frequency signal (for example, 76.5 GHz), based on the modulation signal generated from the signal generation unit 11, and outputs the same to the transmission antenna 13, as a transmission signal of a frequency band of which a central frequency is 76.5 GHz.

The transmission antenna 13 outputs a transmission wave relating to the transmission signal to the outside of the vehicle. In this illustrative embodiment, the radar apparatus 1 has two transmission antennae of the transmission antenna 13a and the transmission antenna 13b. The transmission antennae 13a, 13b are switched with a predetermined cycle by a switching operation of a switching unit 131, and the transmission wave is continuously output to the outside of the vehicle from the transmission antenna 13 connected to the oscillator 12. The transmission antenna 13a and the transmission antenna 13b have different arrangements (antenna patterns) of antenna devices. Thereby, as shown in FIG. 1, the beam patterns of the transmission waves that are transmitted from the transmission antennae 13a, 13b are different.

The switching unit 131 is a switch for switching connection between the oscillator 12 and the transmission antennae 13 and connects any one of the transmission antennae 13a and the transmission antennae 13b and the oscillator 12 according to a signal of the transmission control unit 107.

The reception antenna 14 is a plurality of array antennae that receives the reflected waves coming from the target at which the transmission waves continuously transmitted from the transmission antennae 13 are reflected. In this illustrative embodiment, the four reception antennae 14a (ch1), 14b (ch2), 14c (ch3) and 14d (ch4) are provided. In the meantime, each of the reception antennae 14a to 14d is arranged at an equal interval.

The mixer 15 is provided at each reception antenna. The mixer 15 mixes a reception signal and a transmission signal. The reception signal and the transmission signal are mixed, so that a beat signal, which is a difference signal between the reception signal and the transmission signal, is generated and is then output to the LPF 16.

Here, the reception signal and the transmission signal generating the beat signal are described with reference to an FW-CW (Frequency Modulated Continuous Wave) signal processing method shown in FIG. 3. Meanwhile, in this illustrative embodiment, the FW-CW method is described below. However, the invention is not limited to the FW-CW method and any method can be adopted inasmuch as the method derives a target by combining a plurality of sections including an UP section in which a frequency of a transmission signal ascends and a DOWN section in which a frequency of a transmission signal descends.

Also, symbols that are shown in equations and FIG. 3 for signals and beat frequencies of the FW-CW are as follows: fr: distance frequency, fd: speed frequency, fo: central frequency of transmission wave, $\Delta F$: frequency shift width, fm: repetition frequency of modulation wave, c: light speed (speed of electric wave), T: round-trip time of electric wave between vehicle CR and target, fs: transmission/reception frequency, D: longitudinal distance, V: relative speed, $\theta m$: angle of target, $\theta up$: angle corresponding to a peak signal in an UP section, $\theta dn$: angle corresponding to a peak signal in a DOWN section.

<2. FW-CW Signal Processing>

As an example of the signal processing that is used for target deriving processing, FW-CW (Frequency Modulated Continuous Wave) signal processing is described. Meanwhile, in this illustrative embodiment, the FW-CW method is exemplified. However, the invention is not limited to the FW-CW method and any method can be adopted inasmuch as the method detects a position and the like of a target by combining a plurality of sections including a section in which a frequency ascends and a section in which a frequency descends.

Figure 3:
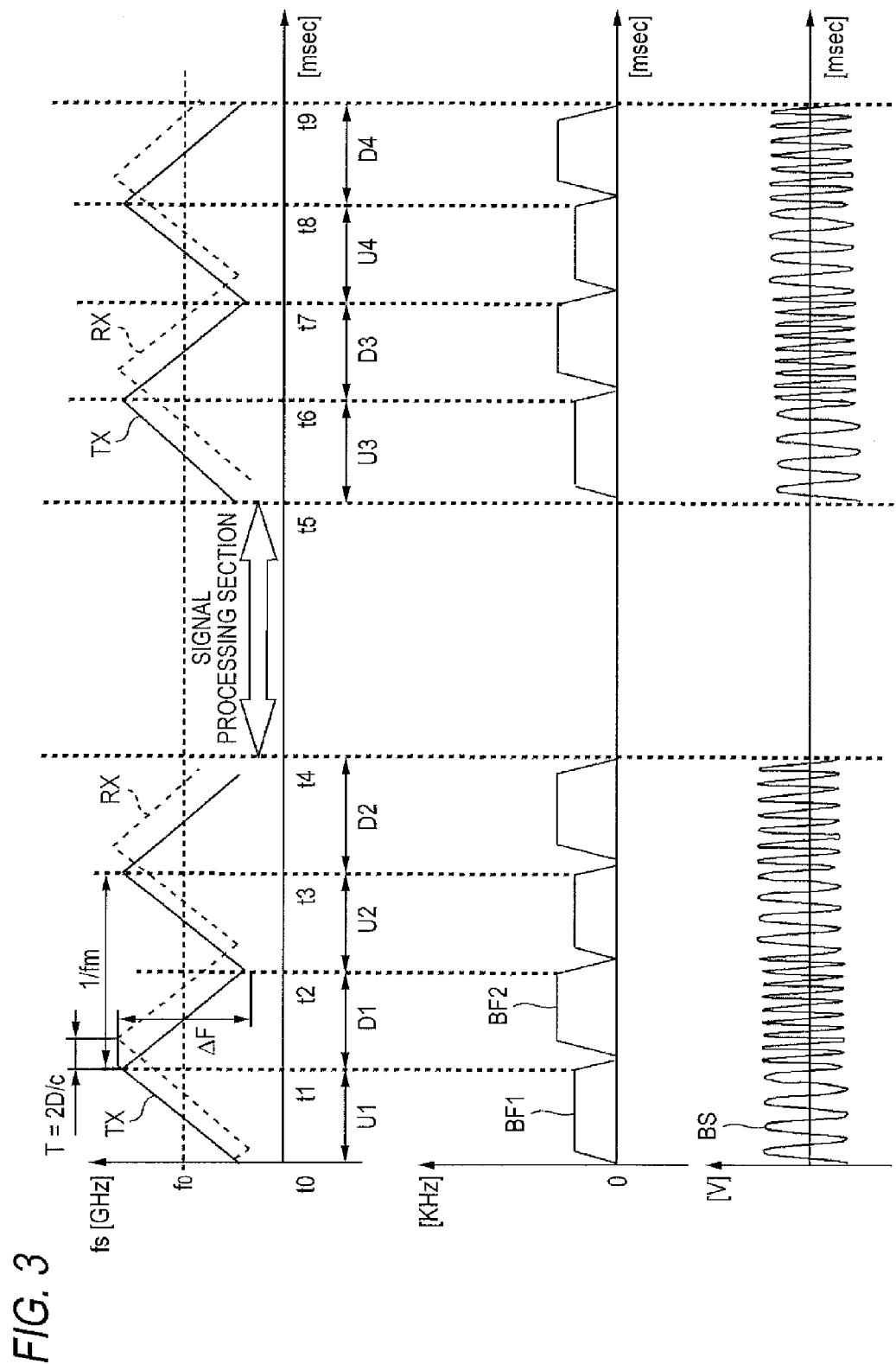
FIG. 3 is a view showing a signal of an FW-CW method.

FIG. 3 is a view showing a signal of the FW-CW method. At the upper of FIG. 3, signal waveforms of a transmission signal TX and a reception signal RX of the FW-CW method are shown. Also, at the middle of FIG. 3, a beat frequency resulting from a difference between the transmission signal TX and the reception signal RX is shown. Also, at the lower of FIG. 3, a beat signal corresponding to the beat frequency is shown.

At the upper of FIG. 3, a vertical axis indicates a frequency [kHz] and a horizontal axis indicates a time [msec]. In FIG. 3, the transmission signal TX has a central frequency fo (for example, 76.5 GHz) and repeats a constant change between 200 MHz so that it ascends up to a predetermined frequency (for example, 76.6 GHz) and then descends to a predetermined frequency (for example, 76.4 GHz). Like this, the transmission signal has a section (hereinafter, also referred to as 'UP section', for example, sections U1, U2, U3, U4 shown in FIG. 3 are UP sections) in which the frequency ascends to a predetermined frequency and a section (hereinafter, also referred to as 'DOWN section', for example, sections D1, D2, D3, D4 are DOWN sections) in which the frequency descends to a predetermined frequency after it has ascended to the predetermined frequency. Also, when the transmission wave transmitted from the transmission antennae 13 collides with an object and is then received at the reception antenna 14 as a reflected wave, the reception signal RX is input into the mixer 15 through the reception antenna 14. Like the transmission signal TX, the reception signal RX also has a section in which the frequency ascends to a predetermined frequency and a section in which the frequency descends to a predetermined frequency.

In the meantime, the radar apparatus 1 of this illustrative embodiment transmits a transmission wave, which corresponds to two cycles of the transmission signal TX in which one cycle of the transmission signal TX is a combination of one UP section and one DOWN section, to the vehicle outside. For example, in a first cycle (an UP section U1 of time t0 to t1 and a DOWN section D1 of time t1 to t2), a transmission wave having the beam pattern NA is output from the transmission antennae 13a. In a second cycle (an UP section U2 of time t2 to t3 and a DOWN section D2 of time t3 to t4) that is a next cycle, a transmission wave having the beam pattern BA is output from the transmission antennae 13b. Then, the signal processing unit 18 performs signal processing for deriving target information by the transmission signal TX and the reception signal RX (a signal processing section of time t4 to t5). After that, in a third cycle (an UP section U3 of time t5 to t6 and a DOWN section D3 of time t6 to t7), a transmission wave having the beam pattern NA is output from the transmission antennae 13a, in a fourth cycle (an UP section U4 of time t7 to t8 and a DOWN section D4 of time t8 to t9), a transmission wave having the beam pattern BA is output from the transmission antennae 13b and then the signal processing unit 18 performs the signal processing for deriving target information. Then, the same processing is repeated.

In the meantime, the reception signal RX has a temporal delay (time T), compared to the transmission signal TX, depending on the distance between the target and the vehicle CR. Also, when there is a speed difference between a speed of the vehicle CR and a speed of the target, a difference corresponding to a Doppler shift is caused in the reception signal RX relative to the transmission signal TX.

At the middle of FIG. 3, a vertical axis indicates a frequency [kHz] and a horizontal axis indicates time [msec]. In FIG. 3, a beat frequency indicating a difference between the transmission signal and the reception signal of the UP section and the DOWN section is shown. For example, in the section U1, a beat frequency BF1 is derived, and in the section D1, a beat frequency BF2 is derived. Like this, the beat frequency is derived in each section.

At the lower of FIG. 3, a vertical axis indicates an amplitude [V] and a horizontal axis indicates time [msec]. In FIG. 3, an analog beat signal BS corresponding to the beat frequency is shown. The beat signal BS is filtered in the LPF 16 that will be described later and is then converted into digital data by the AD converter 17. Meanwhile, FIG. 3 shows the beat signal BS corresponding to the reception signal RX that is received from one reflection point. When the transmission wave corresponding to the transmission signal TX is reflected on a plurality of reflection points and is received at the reception antenna 14 as a plurality of reflected waves, signals corresponding to the reflected waves are generated as the reception signal RX. The beat signal BS indicating a difference between the transmission signal TX and the reception signal RX is a signal that is obtained by combining respective differences between the plurality of reception signals RX and the transmission signal TX.

Returning back to FIG. 2, the LPF (Low Pass Filter) 16 is a filter that reduces a frequency component higher than a predetermined frequency without reducing a frequency component lower than the predetermined frequency. That is, a cutoff frequency is set so that at least a frequency component of a target, which is to be controlled, can pass. For example, as shown in a filter characteristic diagram of FIG. 13, a signal component of a frequency 1187 BIN, which corresponds to a relatively high frequency, is reduced so that a value of a signal level thereof is −16 dB. In the meantime, like the mixer 15, the LPF 16 is provided for each reception antenna.

The AD converter 17 samples the beat signal, which is an analog signal, with a predetermined cycle, thereby deriving a plurality of sampling data. Then, the AD converter quantizes the sampled data to thus convert the beat signal of the analog data into digital data, thereby outputting the digital data to the signal processing unit 18. In the meantime, the AD converter 17 is also provided to each reception antenna, like the mixer 15.

After the beat signal BS is converted into the digital data by the AD converter 17, the digital data is FFT-processed by the signal processing unit 18, so that FFT data having a signal level value or phase information for each frequency BIN of the beat signal BS is acquired.

The signal processing unit 18 is a computer having a CPU 181 and a memory 182, performs the FFT processing for the beat signal of the digital data output from the AD converter 17 to thus acquire the FFT data and extracts a signal having a signal level value exceeding a predetermined threshold from the beat signal of the FFT data, as a peak signal.

Figure 4:
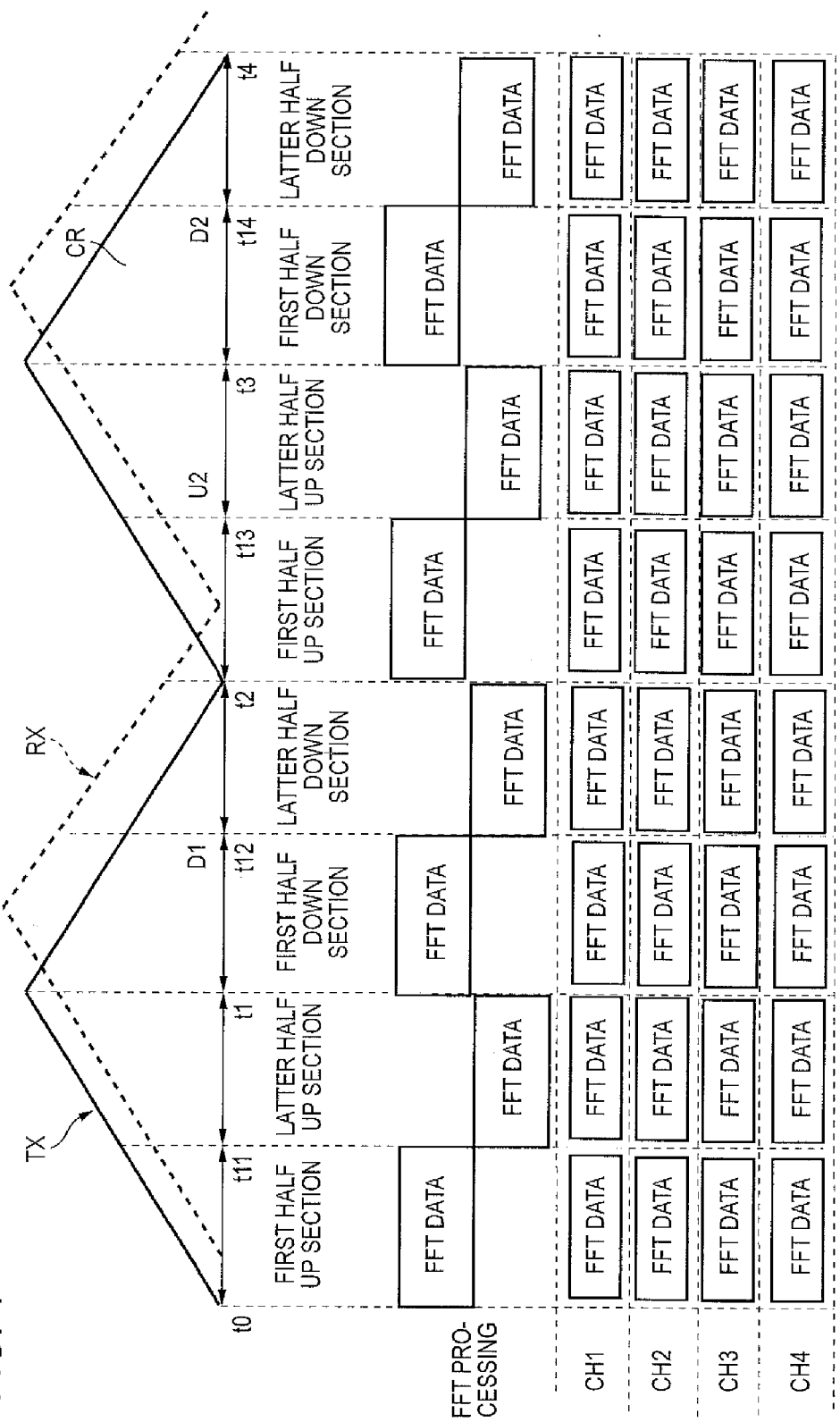
FIG. 4 is a view showing FFT data that is acquired in each transmission period of two cycles of a transmission signal.

Here, the FFT data that is acquired by the signal processing unit 18 during each transmission period is described with reference to FIG. 4. FIG. 4 is a view showing the FFT data that is acquired in each transmission period of two cycles (time t0 to t4) of the transmission signal TX. The first cycle of time t0 to t2 is divides into an UP section of time t0 to t1 and a DOWN section of time t1 to t2. The UP section is divided into a first half UP section of time t0 to t11 and a latter half UP section of time t11 to t1 and the DOWN section is divided into a first half DOWN section of time t1 to t12 and a latter half DOWN section of time t12 to t2.

One FFT data is acquired in the first half UP section of the first cycle. Like this, the FFT data is acquired in each of the latter half UP section, the first half DOWN section and the latter half DOWN section. Thus, a total of four FFT data is acquired in the UP section (the first half UP section and the latter half UP section) and the DOWN section (the first half DOWN section and the latter half DOWN section) of the first cycle. In the meantime, since the FFT data is acquired at each of the four reception antennae (the reception antennae 14a to 14d), a total of 16 FFT data is acquired in the UP section and DOWN section (time t0 to t2) of the first cycle, as shown in FIG. 4. Also, as described above, in the first cycle, the transmission wave corresponding to the transmission signal TX is output with the beam pattern NA of the transmission antennae 13a.

Then, like the first cycle, the FFT data is acquired in each of the first half UP section (time t2 to t1 ), the latter half UP section (time t13 to t3), the first half DOWN section (time t3 to t14) and the latter half DOWN section (time t14 to t4) of the second cycle. That is, since a total of four FFT data is acquired and the FFT data is acquired at each of the four reception antennae, a total of 16 FFT data is acquired in the UP section and DOWN section (time t2 to t4) of the second cycle. As a result, a total of 32 FFT data is acquired in the one time target deriving processing (in the transmission period of two cycles of the transmission signal TX). Also, as described above, in the second cycle, the transmission wave corresponding to the transmission signal TX is output with the beam pattern BA of the transmission antennae 13b.

Here, the FFT data is specifically following data. That is, the FFT data is data including signal levels of the beat signals of respective BINs in a frequency region (hereinafter, referred to as a 'first region') (0700 BIN) including a frequency up to an upper limit frequency of a peak signal corresponding to a target, which is to be output to the vehicle control device 2 of the radar apparatus 1, and in a frequency region (hereinafter, referred to as a 'second region') (7011023 BIN) including a frequency higher than the upper limit frequency and of a peak signal corresponding to a target, which is not to be output to the vehicle control device 2 of the radar apparatus 1.

When the FFT processing is performed, data of 0 to 1023 BIN is acquired. Regarding this, one feature of this illustrative embodiment is that all data up to 1023 BIN is stored only in the first half UP section (time t0 to t11) and the first half DOWN section (time t1 to t12) of the first cycle and the FFT data that is stored in the remaining sections (time t11 to t1, t12 to t2) of the first cycle and in the whole sections (time t2 to t4) of the second cycle is data up to 0700 BIN. While the data required to control the vehicle is originally data of 0 to 700 BIN, the data of 701 to 1023 BIN is used only for a ghost determination that will be described later. Hence, the data of 701 to 1023 BIN is suppressed to the minimum so as to reduce a storage capacity of the memory 182. Also, the reception antenna, which is a subject for which the data of 0 to 1023 BIN is stored, may be one (for example, data of the reception antenna 14a (ch1)).

In the meantime, the FFT data that is stored in the memory 182 may be data of 0 to 1023 BIN in all sections (time t0 to t2) of the first cycle. Also in this case, it is possible to reduce the storage capacity of the memory 182, compared to a configuration where data of 0 to 1023 BIN is stored for all sections of the first and second cycles.

By using the plurality of FFT data derived as described above, a longitudinal distance, a relative speed and a transverse distance of the target with respect to the vehicle CR are derived. In deriving an angle corresponding to the transverse distance, when performing a calculation such as spatial average, the plurality of FFT data is used to perform the calculation, so that correct angle information can be derived.

Here, the longitudinal distance of the target with respect to the vehicle CR is derived by an equation (1) and the relative speed of the target relative to the vehicle CR is derived by an equation (2). Also, the angle of the target with respect to the vehicle CR is derived by an equation (3). From the angle derived by the equation (3) and the longitudinal distance information of the target, the transverse distance of the target with respect to the vehicle CR is derived by a calculation using a trigonometric function.

[Equation 1]

$$R = \frac{(f_{up} + f_{dn}) \cdot c}{2 \times (4 \times \Delta F \times f_m)} \quad (1)$$

[Equation 2]

$$V = \frac{(f_{up} - f_{dn}) \cdot c}{2 \times (4 \times \Delta F \times f_m)} \quad (2)$$

-continued

[Equation 3]

$$\theta_m = \frac{\theta_{up} + \theta_{dn}}{2} \quad (3)$$

The signal processing unit 18 pairs the peak signal of the UP section and the peak signal of the DOWN section, thereby deriving the target information of the target. Also, the signal processing unit 18 performs processing of determining whether the extracted peak signal is a ghost peak corresponding to a target that does not actually exist and excluding target information corresponding to a peak signal of a ghost from an output object of the radar apparatus. The determination of the ghost peak and the removal of the target information corresponding to the ghost peak will be specifically described later.

The memory 182 stores therein execution programs for a variety of calculation processing and the like that are executed by the CPU 181. Also, the memory 182 stores therein the plurality of target information derived by the signal processing unit 18. The memory stores therein the target information (the longitudinal distance, transverse distance and relative speed of the target) derived in the past target deriving processing (for example, the target deriving processing of previous time (hereinafter, referred to as 'previous time processing')) and in this time target processing (hereinafter, referred to as 'this time processing'). Also, the memory 182 stores therein FFT data 182a that is acquired by the FFT processing. In the FFT data 182a, the FFT data of the past target deriving processing is stored including the FFT data of this time processing.

The transmission control unit 107 is connected to the signal processing unit 18 and outputs a control signal to the signal generation unit 11 generating a modulation signal, based on a signal from the signal processing unit 18. Also, the transmission control unit 107 outputs a control signal to the switching unit 131, to which any one of the transmission antennae 13a and the transmission antennae 13b and the oscillator 12 are connected, based on a signal from the signal processing unit 18.

The vehicle control device 2 controls operations of various devices of the vehicle CR. That is, the vehicle control device 2 acquires information from the various sensors such as the vehicle speed sensor 40 and the steering sensor 41. The vehicle control device 2 operates a variety of devices such as the brake 50 and the throttle 51 to thus control a behavior of the vehicle CR, based on the information acquired from the various sensors and the target information acquired from the signal processing unit 18 of the radar apparatus 1.

An example of the vehicle control that is performed by the vehicle control device 2 is as follows. The vehicle control device 2 performs control of enabling the vehicle CR to follow up a preceding vehicle that is a target traveling at the front of the vehicle CR on an own traffic lane in which the vehicle CR is traveling. Specifically, as the vehicle CR travels, the vehicle control device 2 performs the ACC control of controlling at least one of the brake 50 and the throttle 51 and thus enabling the vehicle CR to follow up the preceding vehicle at a state where a predetermined inter-vehicular distance is secured between the vehicle CR and the preceding vehicle.

Also, the vehicle control device 2 performs control of protecting a passenger in the vehicle CR, in preparation for collision of the vehicle CR with an obstacle. Specifically, when there is a danger that the vehicle CR will collide with an obstacle, the vehicle control device performs the PCS control of displaying a warning by using a warning device (not shown) to a user of the vehicle CR or controlling the brake 50 to thus lower the speed of the vehicle CR. Also, the vehicle control device 2 performs the PCS control of fastening a passenger to a seat by a seat belt in the vehicle or fixing a headrest to thus reduce a damage to a user of the vehicle CR, which is caused due to shock upon the collision.

The vehicle sensor 40 outputs a signal corresponding to the speed of the vehicle CR, based on the number of revolutions of an axle of the vehicle CR. The vehicle control device 2 acquires a current vehicle speed, based on the signal from the vehicle speed sensor 40.

The steering sensor 41 detects a rotating angle of a steering wheel resulting from an operation of a driver of the vehicle CR and transmits the angle information of the vehicle body of the vehicle CR to the vehicle control device 2.

The brake 50 decelerates the speed of the vehicle CR in response to an operation of the driver of the vehicle CR. Also, the brake 50 decelerates the speed of the vehicle CR under control of the vehicle control device 2. For example, the brake decelerates the speed of the vehicle CR so that the distance between the vehicle CR and the preceding vehicle is kept constant.

The throttle 51 accelerates the speed of the vehicle CR in response to an operation of the driver of the vehicle CR. Also, the throttle 51 accelerates the speed of the vehicle CR under control of the vehicle control device 2. For example, the throttle 51 accelerates the speed of the vehicle CR so that the distance between the vehicle CR and the preceding vehicle is kept constant.

<2. Processing Flow Chart>
<2-1. Overall Processing>

Figure 5:
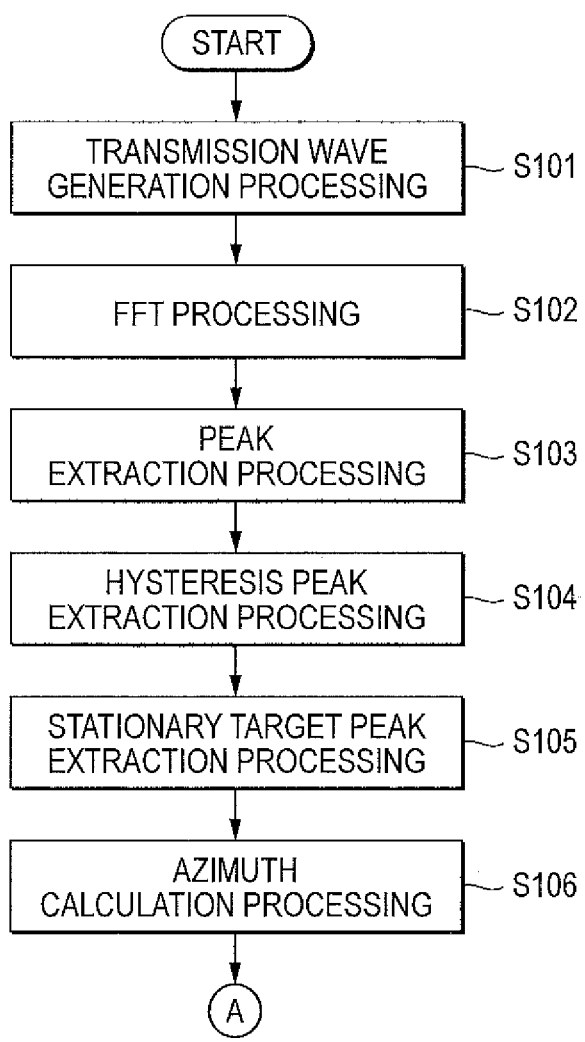
FIG. 5 is a flow chart showing target information deriving processing, which is performed by a signal processing unit.
Figure 6:
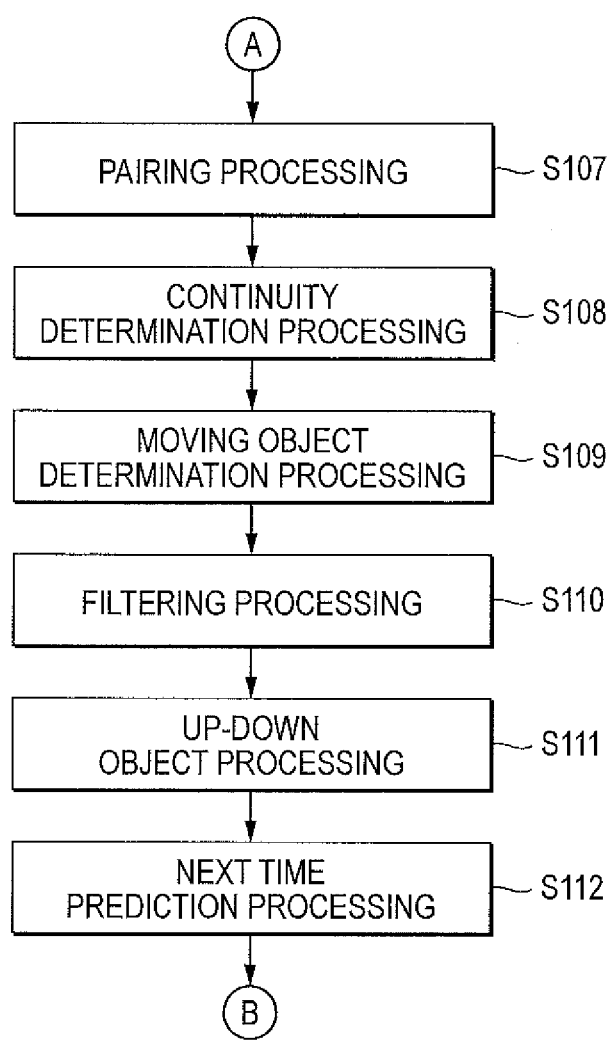
FIG. 6 is a flow chart showing the target information deriving processing, which is performed by the signal processing unit.
Figure 7:
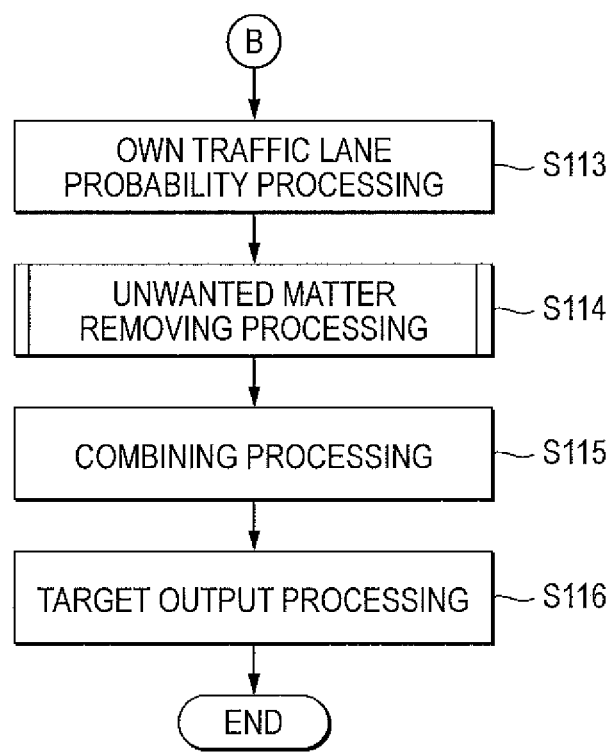
FIG. 7 is a flow chart showing the target information deriving processing, which is performed by the signal processing unit.

FIGS. 5 to 7 are flow charts of target information deriving processing that is executed by the signal processing unit 18. First, the signal processing unit 18 outputs an instruction signal for generating a transmission wave to the transmission control unit 107 (step S101). Then, the signal generation unit 11 is controlled by the transmission control unit 107 to which the instruction signal is input from the signal processing unit 18, and a transmission wave corresponding to the transmission signal TX is generated. The generated transmission wave is output to the outside of the vehicle.

Then, the reception antenna 14 receives a reflected wave coming from a target at which the transmission wave is reflected, and the reception signal RX corresponding to the reflected wave and the transmission signal TX are mixed by the mixer 15, so that a beat signal BS, which is a difference signal between the transmission signal and the reception signal, is generated. Then, the beat signal BS that is an analog signal is filtered by the LPF 16, is converted into digital data by the AD converter 17 and is then input to the signal processing unit 18.

The signal processing unit 18 performs the FFT processing for the beat signal of the digital data (step S102) and acquires the FFT data (for example, data FT1 shown in FIG. 9) having signal level values of the beat signals of the respective frequency BINs (for example, respective BINs between 0 and 1023 BIN). The FFT data is data including signal level values of the beat signals of the respective BINs in the first region (0 to 700 BIN) and the second region (701 to 1023 BIN).

In peak extraction processing of step S103 that will be described below, the signal processing unit 18 performs the processing by using the FFT data in only the first region. Also, in unwanted matter removing processing of step S114 that will be specifically descried later, the signal processing unit 18 performs the processing by using the FFT data in all regions of the first and second regions.

Then, the signal processing unit 18 extracts, as a peak signal, a beat signal having a signal level value exceeding a predetermined threshold from the beat signals of the respective BINs of the first region of the FFT data (step S103). Meanwhile, in this processing, the peak signals of all sections of the UP sections (the first half UP sections (time t0 to t1, time t2 to t13) and the latter half UP sections (time t11 to t1, time t13 to t3)) and the DOWN sections (the first half DOWN sections (time t1 to t12, time t3 to t14) and the latter half DOWN sections (time t12 to t 2, time t14 to t4)) of the two cycles (for example, time t0 to t4) of the transmission period are extracted and the number of peak signals that should be processed by the signal processing unit 18 in this time processing is decided.

Then, from the peak signals of this time processing extracted in the peak extraction processing, the signal processing unit 18 extracts a peak signal of this time processing, which exists in ±3 BIN with respect to a frequency of a predicted peak signal obtained by predicting a peak signal of this time processing from the target derived in the previous time processing, as a hysteresis peak signal having temporal continuity to the peak signal of the previous time processing (step S104).

Then, from the speed information of the vehicle CR output from the vehicle speed sensor 40, the signal processing unit 18 performs processing of extracting a peak signal of each section, in which a frequency difference between the peak signal of the UP section and the peak signal of the DOWN section becomes a frequency difference corresponding to the speed, as a peak signal corresponding to a stationary object (step S105). Here, the stationary object means a target having the substantially same relative speed as the speed of the vehicle CR. Also, a target that moves at a specific speed and has a different relative speed from the speed of the vehicle CR is hereinafter referred to as a moving object.

In the meantime, the reason to perform the hysteresis peak extraction (step S104) and the stationary object peak extraction (step S105) is that the signal processing unit 18 is to select a peak signal corresponding to a target that should be preferentially output to the vehicle control device 2. For example, the peak signal of the target of this time processing having temporal continuity to the target derived in the previous time processing may have a high priority because there is a high probability that a target actually exists, compared to a newly derived target that has not been derived in the previous time processing, and also may have a high priority because a peak signal corresponding to a moving object has a high possibility that the moving object will collide with the vehicle CR, compared to a peak signal corresponding to a stationary object.

In each of the UP and DOWN sections, the signal processing unit 18 performs an azimuth calculation, based on the peak signals (step S106). Specifically, the signal processing unit 18 derives an azimuth (angle) of the target by a predetermined azimuth calculation algorithm. For example, the azimuth calculation algorithm is an ESPRIT (Estimation of Signal Parameters via Rotation Invariance Techniques), calculates an eigenvalue of a correlation matrix, an eigenvector and the like from the phase information of the reception signals received at the respective reception antennae 14a to 14d and derives an angle θup corresponding to a peak signal of the UP section and an angle θdn corresponding to a peak signal of the DOWN section. When the respective peak signals of the UP and DOWN sections are paired, an angle of the target is derived by the equation (3).

Also, the frequency BIN information of one peak signal corresponds to the information of the longitudinal distance and relative speed of the target. However, the frequency BIN of one peak signal may include a plurality of target information. For example, regarding the position information of the target relative to the vehicle CR, a plurality of target information in which the longitudinal distances are the same and the angles are different may be included in the peak signal of the same frequency BIN. In this case, the phase information of a plurality of reflected waves coming at different angles becomes different phase information, respectively. Therefore, the signal processing unit 18 derives a plurality of target information existing at different angles for one peak signal, based on the phase information of the respective reflected waves.

Here, when performing the azimuth calculation, a phase may be 360°-rotated depending on the angle of the target, so that information of an angle different from an original angle at which the target exists may be derived. Specifically, for example, when the phase information of the reflected wave from a target, which is received at the reception antenna, is 420°, even though an actual target exists in the area of the beam pattern BA, other than the beam pattern NA shown in FIG. 1, the actual target may be determined that the phase information is 60° (420°-360°) due to the phase fold-back and erroneous angle information that the target exists in the area of the beam pattern NA not included in the beam pattern BA may be derived. Therefore, the transmission waves of the different beam patterns are respectively output from the two transmission antennae of the transmission antennae 13a, 13b and the reception levels at the respective transmission antennae as regards the same target are compared, so that a correct angle of the target is derived.

Specifically, an angle is derived as follows, based on the reflected waves with respect to the transmission waves of the respective beam patterns. When the phase information of the reflected wave is 60°, the signal level values of angle spectra corresponding to the reflected wave of the transmission wave output from the transmission antennae 13a and the reflected wave of the transmission wave output from the transmission antennae 13b are compared. When the signal level value of the angle spectrum corresponding to the reflected wave of the transmission wave output from the transmission antennae 13a is larger, an angle corresponding to the phase information of 60° in the area of the beam pattern NA except for the area of the beam pattern BA is derived as a target angle. Also, when the signal level value of the angle spectrum corresponding to the reflected wave of the transmission wave output from the transmission antennae 13b is larger, an angle corresponding to the phase information of 420° in the area of the beam pattern BA except for the area of the beam pattern NA is derived as a target angle. Like this, by the transmission waves of two cycles of the transmission signal TX, the transmission waves of the different beam patterns are output every cycle, so that it is possible to prevent the erroneous angle information of the target from being derived due to the phase fold-back upon the azimuth calculation.

Then, the signal processing unit 18 performs pairing processing of pairing the peak signals of the UP and DOWN sections (step S107). The pairing processing is performed on the basis of all FFT data from 0 to 700 BIN in both the UP and DOWN sections. For the hysteresis peak signals extracted in the hysteresis peak extraction processing (step S104) from all the peak signals derived in the processing of step S103, the pairing processing is performed between the hysteresis peak signal of the UP section and the hysteresis peak signal of the DOWN section. Also, for the stationary object peak signal extracted in the stationary object peak extraction processing (step S105), the pairing processing is performed between the stationary object peak signal of the UP section and the stationary object peak signal of the DOWN section. Also, for the other peak signals except for the hysteresis peak signals and stationary object peak signals of all the peak signals extracted in the peak extraction processing, the pairing processing is performed between the other peak signals of the UP section and the other peak signals of the DOWN section.

In the meantime, the pairing processing between the peak signal of the UP section and the peak signal of the DOWN section is performed through a calculation of using a Mahalanobis distance, for example. Specifically, a plurality of normal-paired data paired in a correct combination and mispaired data paired in an incorrect combination during the experimental pairing between the peak signal of the UP section and the peak signal of the DOWN section before the radar apparatus 1 is mounted on the vehicle CR is acquired. Then, from three parameter values of 'a difference of signal level values', 'a difference of angle values' and 'a difference of signal level values of angle spectra' between the peak signal of the UP section and the peak signal of the DOWN section in the plurality of normal-paired data, average values are derived for each of the three parameters of the plurality of normal-paired data and are then stored in the memory 182 in advance.

After the radar apparatus 1 is mounted on the vehicle CR, when the signal processing unit 18 derives the target information, it derives a Mahalanobis distance with an equation (4) by using the three parameter values of all combinations of the peak signals of the UP section and the peak signals of the DOWN section of the peaks signals of the FFT data acquired in this time processing and the average values for each of the three parameters of the plurality of normal-paired data. The signal processing unit 18 derives, as the normal-paired data, paired data of this time processing having a minimum Mahalanobis distance. Here, the Mahalanobis distance is a distance for one group expressed by a multivariable vector $x=(x1, x2, x3)$ where an average $\mu=(\mu1, \mu2, \mu3)^T$ and a covariance matrix is $\Sigma$, and is derived by the equation (4). In the meantime, $\mu1$, $\mu2$ and $\mu3$ indicate the three parameter values of the normal-paired data and $x1$, $x2$ and $x3$ indicate the three parameter values of the paired data of this time processing.

$$D_M(x) = \sqrt{(x-\mu)^T \Sigma^{-1} (x-\mu)} \quad \text{[Equation 4]}$$

Then, the signal processing unit 18 derives a transverse distance, based on the longitudinal distance, relative distance and angle of the paired data determined as the normal-paired data, by using the parameter values of the normal-paired data in the pairing processing and the equations (1) to (3). Here, regarding the transverse distance, an absolute transverse distance and a relative transverse distance are derived. The absolute transverse distance is a transverse distance in which a left direction of the vehicle CR in the vehicle width direction is − (minus) and a right direction thereof is + (plus) on the basis of the reference axis BL of ±0 m. Also, the relative transverse distance is a distance that is derived from information on a curve radius of the own traffic lane, in which the vehicle CR is traveling, and the information on the longitudinal distance and absolute transverse distance of the target, as a transverse distance of the target corresponding to the curve radius. Specifically, the relative transverse distance is a distance in which a left direction of the vehicle CR in the vehicle width direction is − (minus) and a right direction thereof is + (plus) on the basis of the reference axis BL of ±0 m, which virtually changes in a linear or curved shape depending on information on a rotating angle of the steering wheel that is input from the steering sensor 41 as a driver of the vehicle CR operates the steering wheel of the vehicle CR. In the below, when the transverse distance is simply described, it means the absolute transverse distance. In the meantime, when it is necessary to use a curved state of the traffic line in calculating a transverse position, the relative transverse distance is used as the target information.

Then, the signal processing unit 18 performs continuity determination processing of determining whether there is a temporally continuous relation between target information (hereinafter, referred to as 'this time pair target information') of this time paired data paired in this time processing and information (hereinafter, referred to as 'predicted target information') predicting this time pair target information from the target information of the target in the previous time processing (step S108). Here, the predicted target information is information that is obtained as the signal processing unit 18 predicts target information including the position information of the longitudinal distance and transverse distance and the relative speed information in this time processing, from a change in a value of the relative speed information of the target information of the previous time processing or the target information until now, and the like. The case where there is a temporally continuous relation between this time pair target information and the predicted target information in this time processing is a case where respective difference values of the longitudinal distances, transverse distances and relative speeds included in this time pair target information and the predicted target information are within predetermined values. In the meantime, when the plurality of predicted target information is within the predetermined values, the signal processing unit 18 determines that the predicted target information, which has the difference value between the predicted target information and this time pair target information within the smallest predetermined value, has a temporally continuous relation with this time pair target information, and performs filter processing of step S110 (which will be described later) for this time paired data (hereinafter, referred to as 'past correspondence paired data') having this time pair target information having the temporally continuous relation with the predicted target information.

Also, when the respective difference values of the longitudinal distances, transverse distances and relative speeds included in this time pair target information and the predicted target information are not within predetermined values, the signal processing unit 18 determines that there is no temporally continuous relation between this time pair target information and the predicted target information. This paired data (hereinafter, referred to as 'new paired data') having this time pair target information for which it is determined that there is no temporally continuous relation with the predicted target information becomes a target that is first derived in this time processing. In the meantime, since the new paired data has no predicted target information, the longitudinal distance, transverse distance and relative speed of the new paired data become target information of one target in this time processing, in the filter processing of step S110 (which will be described later).

Then, the signal processing unit 18 derives paired data corresponding to the moving object from the information of the speed of the vehicle CR and the relative speed of the paired data (step S109). By this processing, it is possible to derive the paired data that should be preferentially processed.

When there is a temporally continuous relation between this time pair target information and the predicted target information, the signal processing unit 18 performs filtering of the longitudinal distance, transverse distance and relative speed included in the this time pair target information and the predicted target information (S110) and derives the filtered target information, as the target information of the target of this time processing.

Specifically, when there is a temporally continuous relation between this time pair target information and the predicted target information, the signal processing unit 18 performs weighting of a filter constant 0.75 for the transverse distance of the predicted paired data as regards the transverse distance and weighting of a filter constant 0.25 for the transverse distance of this time paired data and derives a sum of both values as a transverse distance of the past correspondence paired data of this time processing. In the meantime, the filtering processing is also performed for the longitudinal distance, relative speed and signal level value by using predetermined filter constants.

Then, the signal processing unit 18 performs up-down object processing of deriving a stationary object that is not necessary as regards the control of the vehicle CR (step S111). Specifically, the signal processing unit derives a position of a stationary object in a vehicle height direction of the vehicle CR and derives a stationary object (for example, a road marker of a cantilever or door-type provided above a roadway) having a position that is higher than a predetermined height (for example, higher than the vehicle height of the vehicle CR). Also, the signal processing unit derives a stationary object (for example, a road rivet such as chatter bar having a position lower than the vehicle height of the vehicle CR). The target information of the stationary object derived as described above is removed in an unwanted matter removing processing (which will be described later) and is not output to the vehicle control device 2 from the radar apparatus 1, as the target information.

In processing (hereinafter, referred to as 'next time processing') that is performed next to this time processing, the signal processing unit 18 derives predicted values (predicted longitudinal distance, predicted relative speed, predicted transverse distance and the like) of the target information, which are used in the hysteresis peak extraction processing (step S104) of next time processing (step S112). Specifically, the signal processing unit derives 20 target information having a high priority when performing the vehicle control, calculates predicted values of the peak signals of this time processing of the respective UP and DOWN sections and uses the predicted values in the hysteresis peak deriving processing in next time processing. Regarding the priority, when performing the ACC control, a target having a transverse distance equivalent to an own traffic lane on which the vehicle CR is traveling and having a relatively short longitudinal distance to the vehicle CR has a high priority and a target having a transverse distance equivalent to an adjacent traffic lane and a relatively long longitudinal distance to the vehicle CR has a low priority. Also, when performing the PCS control, a target having a relatively short time-to-collision ('TTC') has a high priority and a target having a relatively long TTC has a low priority.

Then, the signal processing unit 18 derives a probability that the target exists on the own traffic lane from two-dimensional map data having relative transverse distance and longitudinal distance beforehand stored in the memory 182, as parameters, based on the relative transverse distance and longitudinal distance of the target with respect to the vehicle CR (step S113). As an absolute value of the relative transverse distance relative to the vehicle CR becomes larger, a value of the probability is decreased, and as the longitudinal distance to the vehicle CR becomes larger, the value of the probability is decreased. In the meantime, the larger probability means that a target exists on the own traffic lane on which the vehicle CR is located. Therefore, the corresponding target is regarded as a control target of the ACC, for example.

Then, the signal processing unit 18 performs processing of removing a target, which is not necessary to be output to the vehicle control device 2, for the target information derived in the past processing (step S114). For example, the signal processing unit 18 removes the target information derived in the up-down object processing of step S111, the target information of a ghost peak corresponding to a target that does not actually exist and caused due to an interference (intermodulation) between a peak signal corresponding to an actual target existing in a predetermined distance or larger and a switching noise of a DC-DC converter of a power supply device (not shown) of the radar apparatus 1, and the like. In the meantime, the processing of removing the target information of the ghost peak will be specifically described later.

Subsequently, the signal processing unit 18 performs processing of combining a plurality of target information into target information corresponding to one object (step S115). For example, when the transmission wave is emitted from the transmission antenna 13 of the radar apparatus 1 and is reflected on the preceding vehicle, a plurality of reflected waves is received at the reception antenna 14. That is, the reflected waves from a plurality of reflection points of the same object arrive at the reception antenna 14. As a result, the signal processing unit 18 derives a plurality of the target information having different position information, based on the respective reflected waves. However, since the plurality of the target information is originally the target information on one vehicle, the signal processing unit combines the respective target information as one and treats the combined target information as the target information on the same object. For this reason, when the respective relative speeds of the plurality of the target information are substantially the same and the longitudinal distances and transverse distances of the respective target information are within the predetermined ranges, the signal processing unit 18 regards the plurality of the target information as the target information on the same object and performs combining processing of combining the plurality of the target information as the target information corresponding to one target.

Then, the signal processing unit 18 outputs the target information having a high priority with respect to the output to the vehicle control device 2 from the target information combining-processed in the step S115 to the vehicle control device 2.

<2-2. Unwanted Matter Removing Processing>

Figure 8:
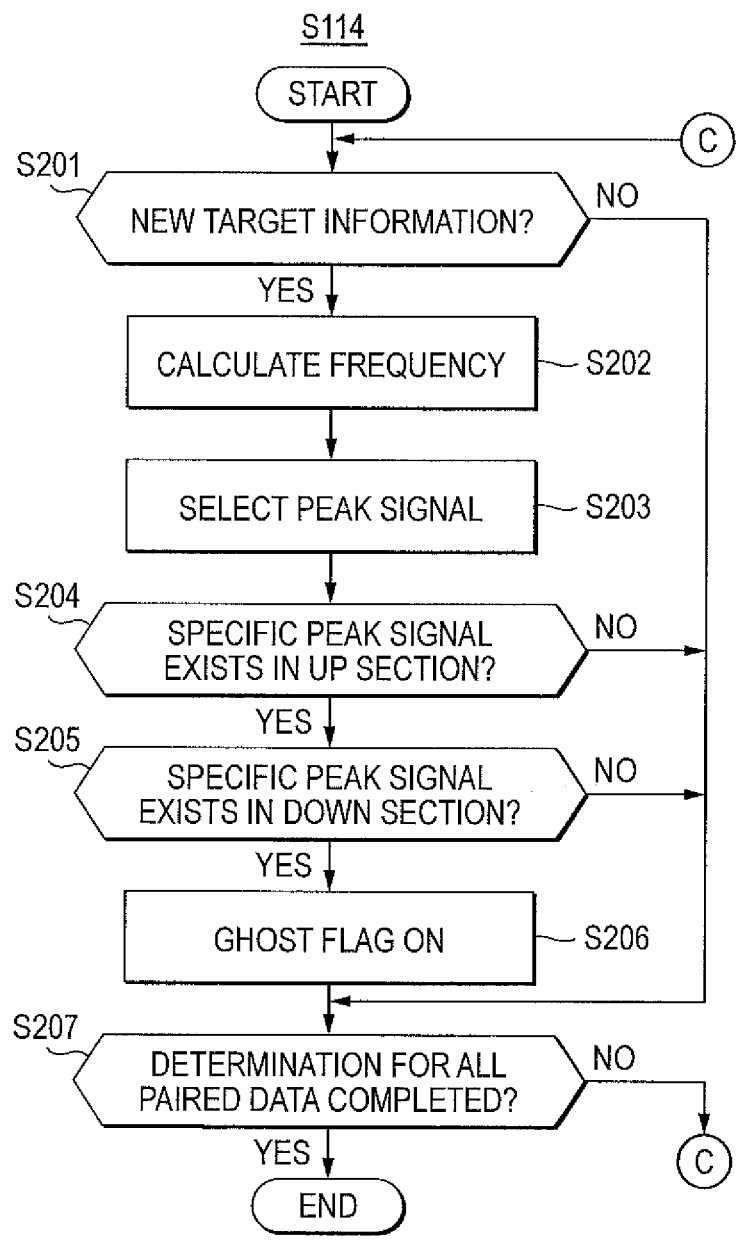
FIG. 8 is a flow chart showing target information removing processing of a ghost peak according to a first illustrative embodiment.
Figure 9:
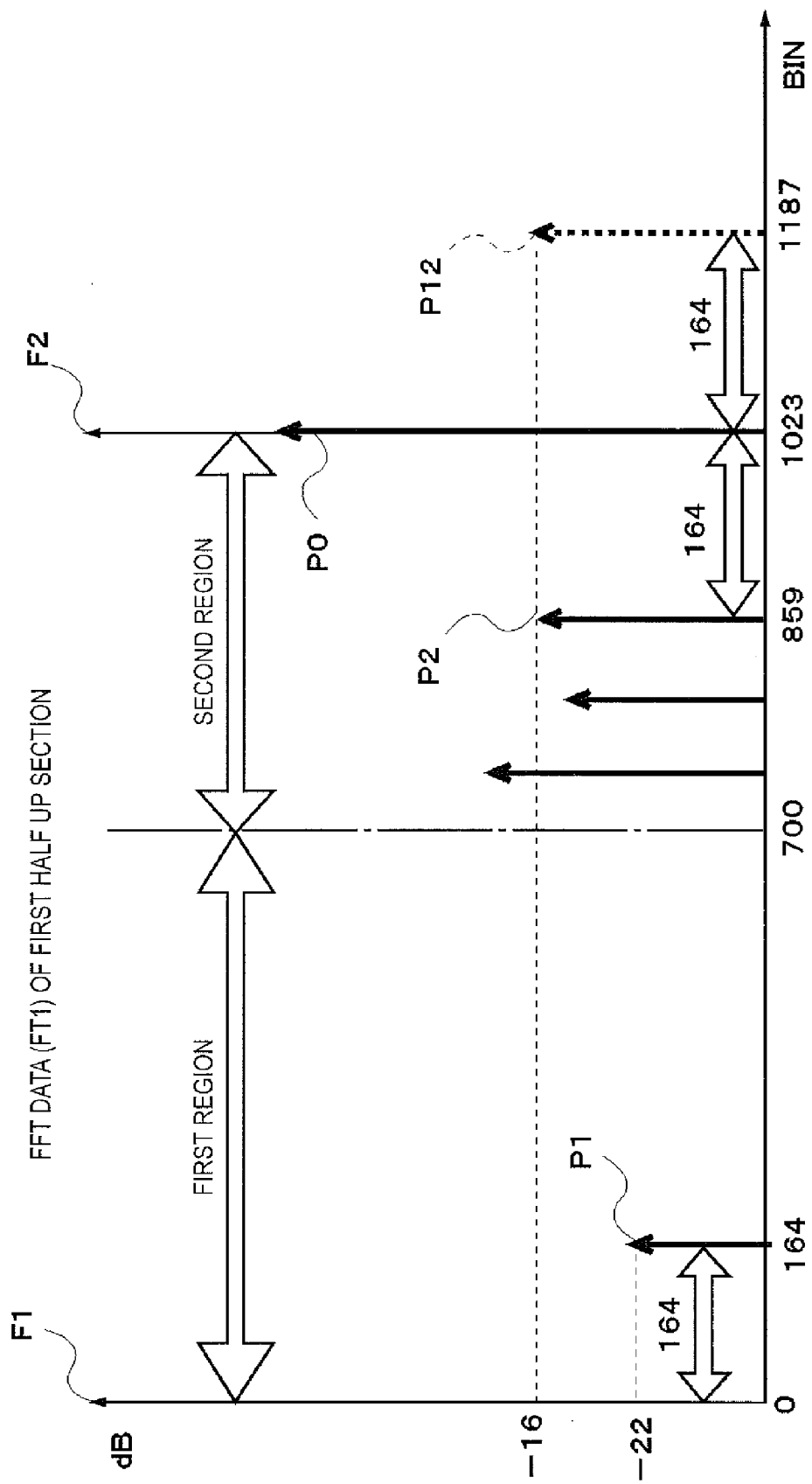
FIG. 9 shows FFT data of the first illustrative embodiment.

Subsequently, in the unwanted matter removing processing described in the step S114 of FIG. 7, the removing processing of the target information corresponding to the ghost peak is specifically described with reference to FIGS. 8 and 9. FIG. 8 is a flow chart showing the target information removing processing of the ghost peak according to the first illustrative embodiment. Also, FIG. 9 shows the FFT data FT1 of the first illustrative embodiment.

First of all, in this processing, the signal processing unit 18 determines any one of the past correspondence paired data and the new paired data in the continuity determination processing of step S108 of FIG. 6 and selects one of the plurality of the target information filtered in the filtering processing of step S110 (since the new paired data has no past target information, the smoothing with the predicted paired data is not performed and the new paired data becomes the new target information, as it is). Then, the signal processing unit 18 determines whether the selected target information (hereinafter, referred to as 'selected target information') is the new target information (step S201). In the meantime, when the selected target information is not the new target information (No in step S201), the signal processing unit 18 performs processing of step S207. The processing of step S207 will be described below.

The signal processing unit 18 calculates a frequency of the peak signal of the UP section and a frequency of the peak signal of the DOWN section configuring the selected target information from the longitudinal distance and relative speed of the selected target information of this time processing (step S202). Then, the signal processing unit reads out the FFT data of the frequency regions (0 to 1023 BIN) of the first and second regions of the first half UP section (time t0 to t11 in FIG. 4) and the FFT data of the frequency regions (0 to 1023 BIN) of the first and second regions of the first half DOWN section (time t1 to t12 in FIG. 4), which are stored in the memory 182, and selects peak signals (a peak signal of the first half UP section and a peak signal of the first half DOWN section, hereinafter referred to as 'selected peak signal'), which exist in the frequency calculated from the new target information, of the peaks signals of the FFT data (step S203).

Then, the signal processing unit 18 determines for the FFT data of 0 to 1023 BIN of the UP section whether another peak signal (hereinafter, referred to as 'specific peak signal') exists at a frequency position that is distant from a frequency (for example, 1023 BIN) of a peak signal, which exists at the frequency (first frequency) of the switching noise of the DC-DC converter, by a frequency of the selected peak signal of the UP section (step S204).

Then, when the specific peak signal exists (Yes in step S204), the signal processing unit 18 performs processing of step S205, which is next processing. On the other hand, when the specific peak signal does not exist in the FFT data of the first half UP section (No in step S204), the signal processing unit 18 performs processing of step S207.

Here, the processing of the selected peak signal and the specific peak signal in the FFT data of the first half UP section is specifically described with reference to FIG. 9. The FFT data FT1 (hereinafter, referred to as 'data FT1') shown in FIG. 9 is FFT data of the first half UP section (time t0 to t11) having a horizontal axis of a frequency axis [unit: BIN] and a vertical axis of a signal level value [unit: dB] and is data including the frequency regions of the first and second regions on the horizontal axis. Specifically, the data FT1 is data having the signal level values of the beat signals in the first region (for example, 0 to 700 BIN) including the frequency up to the upper limit frequency (for example, a frequency 700 BIN) of the peak signal corresponding to a target that is to be output by the radar apparatus 1 and in the second region (for example, 701 to 1023 BIN) that is a frequency region including a frequency of the peak signal corresponding to a target that is not to be output by the radar apparatus 1.

Also, a ghost occurrence cause and a ghost determining method are described with reference to FIG. 9. It is assumed that the frequency of the switching noise of the DC-DC converter exists at 1023 BIN (the peak signal P0) and a peak signal P12 (for example, 1187 BIN) corresponding to an actual target (for example, a strong reflector such as truck distant from the vehicle CR by 461 m) exists at a higher frequency. In this case, when a reception signal from the strong reflector and the switching noise are inter-modulated in the mixer 15, a difference frequency component thereof occurs as a peak signal at a frequency of a selected peak signal P1 (1187 BIN−1023 BIN=164 BIN) by FFT processing. Therefore, the selected peak signal P1 is data of a target that does not actually exist. However, it is not possible to determine whether it is data of a target actually existing or data of a ghost target only with the selected peak signal P1. Thus, in this illustrative embodiment, since it is confirmed that the peak signal (for example, the peak signal P12) coming from the strong reflector existing at a distant distance other than the control target occurs in the second region other than the frequency region of the peak signal of the normal vehicle control target, the signal processing unit determines whether the selected peak signal P1 is a ghost peak by using the confirmation. That is, the FFT data is data from 0 to 1023 BIN. Therefore, the peak signal P12 coming from the actual strong reflector does not appear in the FFT. However, since the peak signal is folded back at a Nyquist frequency F2 (1023 BIN) of the data FT1, which is the second frequency, the specific peak signal P2 appears at the folded back frequency (859 BIN). In other words, the peak signal corresponding to the selected peak signal P1 shows up at the frequency corresponding to the difference frequency between the peak signal P0 of the switching noise and the specific peak signal P2 that is the folded back peak signal of the strong reflector. Therefore, when a peak signal of any frequency is selected as the selected peak signal P1, if another peak signal, i.e., the specific peak signal exists at the position of the difference frequency (859 BIN) between the peak signal P0 (1023 BIN) of the switching noise and the selected peak signal P1(164 BIN), it can be determined that the selected peak signal P1 is a ghost peak.

In FIG. 9, when the selected target information is the new target information (which corresponds to Yes in step S201), the signal processing unit 18 calculates a frequency (for example, 164 BIN) of the selected peak signal of the first half UP section from the distance and relative speed of the selected target information (which corresponds to step S202) and a peak signal (a signal level thereof is −22 dB) existing at the frequency 164 BIN becomes the selected peak signal P1 (which corresponds to step S203).

Then, the signal processing unit 18 determines whether the specific peak signal exists in a range including the frequency (1023 BIN−164 BIN=859 BIN), which is separated from the frequency of the peak signal P0 existing at the frequency 1023 BIN corresponding to the frequency of the switching noise of the DC-DC converter by the frequency (164 BIN) of the selected peak signal, and a 0 (for example, 859 BIN±1 BIN) of the frequency (which corresponds to step S204). In FIG. 9, since the specific peak signal P2 (the signal level thereof is −16 dB) exists at the frequency of 859 BIN, it is determined that there is the specific peak signal (the specific peak signal P2) (which corresponds to Yes in step S204). Here, the specific peak signal P 2 appears as a folded back peak signal at the frequency (1023 BIN−164 BIN=859 BIN) that a peak signal P12 (a signal level thereof is −16 dB), which corresponds to the target (for example, the strong reflector such as truck distant from the vehicle CR by the longitudinal distance of 461 m) actually existing and having a distance and relative speed corresponding to a frequency (for example, 1187 BIN) exceeding the Nyquist frequency F2 (1023 BIN) of the data FT1, which is the second frequency, is folded back by a difference (1187 BIN−1023 BIN=164 BIN) with the Nyquist frequency F2.

Then, returning back to step S205 of FIG. 8, the same processing is performed in the first half DOWN section together with the processing of the first half UP section described in FIG. 9. That is, the signal processing unit 18 derives a selected peak signal in the first half DOWN section and determines whether a specific peak signal exists at the frequency that is distant from the frequency (1023 BIN) of the peak signal corresponding to the switching noise of the DC-DC converter by a frequency of the selected peak signal of the first half DOWN section (step S205) by steps S201 to S203 of FIG. 8.

Then, when a specific peak signal exists in the first half DOWN section (Yes in step S205), the signal processing unit 18 turns on a ghost flag, which indicates that the selected target information is the target information corresponding to the ghost peak (step S206). That is, when the specific peak signal exists in the FFT data of both the first half UP and DOWN sections, the signal processing unit 18 turns on the ghost flag of the selected target information.

The target information having the ghost flag made to be ON is excluded from the output object that is to be output from the radar apparatus 1 to the vehicle control device 2. Like this, when the specific peak signal exists, the target information corresponding to the selected peak signal is excluded from the output object of the radar apparatus. Thereby, it is possible to correctly determine whether the selected peak is the peak signal of the ghost corresponding to a target, which does not actually exist, and to prevent the target information, which is originally not to be controlled, from being output from the radar apparatus 1. As a result, the vehicle control device 2 can appropriately perform the vehicle control, without performing the vehicle control based on the information of the target that does not actually exist.

On the other hand, when it is determined in step S205 that a specific peak signal does not exist in the first half DOWN section (No in step S205), the signal processing unit 18 performs processing of step S207.

Then, the signal processing unit 18 determines whether or not to execute the unwanted matter removing processing for all the target information (step S207). When the unwanted matter removing processing is performed for all the target information (Yes in step S207), the signal processing unit 18 ends the unwanted matter removing processing and executes the next combining processing (step S115). On the other hand, when the unwanted matter removing processing is not performed for all the target information (No in step S207), the signal processing unit returns to the processing of step S201 and executes the unwanted matter removing processing for the target information for which the unwanted matter removing processing has not been performed yet.

Meanwhile, in FIG. 9, the description has been made on the assumption that the specific peak signal P2 is the folded back peak signal that is folded back by the difference between the peak signal P12 of the target, which actually exists, and the Nyquist frequency F2 and the target having the longitudinal distance and relative speed corresponding to the frequency of 859 BIN does not actually exist. In contrast, when a target having the longitudinal distance and relative speed corresponding to the frequency of 859 BIN actually exists, a peak signal exists at a frequency of −164 BIN at a minus side from the frequency F1 of 0 BIN by the interference (intermodulation) between the specific peak signal P2 of the frequency 859 BIN and the switching noise (the frequency 1023 BIN) of the DC-DC converter. A folded back peak signal that is folded back by a difference between the frequency of −164 BIN and the frequency F1 appears at the frequency of 164 BIN as a peak signal corresponding to the selected peak signal P1. As a result, the signal processing unit 18 derives the folded back selected peak signal P1 of the frequency 164 BIN as the target information.

For this reason, when the peak signal P12 of the frequency 1187 BIN is a signal corresponding to the target actually existing and the peak signal corresponding to the selected peak signal P1 appears at the frequency 164 BIN due to the interference (intermodulation) of the peak signal P12 and the peak signal P0 of the switching noise of the DC-DC converter, the signal processing unit 18 determines that the selected peak signal P1 is a ghost signal and removes the selected peak signal by the unwanted matter removing processing. In addition to this, when the specific peak signal P2 of the frequency 859 BIN is a signal corresponding to the target actually existing and the peak signal corresponding to the selected peak signal P1 appears at the frequency 164 BIN due to the interference (intermodulation) of the specific peak signal P2 and the peak signal P0, the signal processing unit 18 also may determine that the selected peak signal P1 is a ghost signal and remove the selected peak signal by the unwanted matter removing processing.

Also, in the unwanted matter removing processing, the signal processing unit 18 acquires the FFT data, which has the signal level values of the beat signals in the first region, which is the frequency region including the frequency up to the upper limit frequency of the peak signal corresponding to the target that is to be output by the radar apparatus, and the second region, which is the frequency region including the frequency higher than the upper limit frequency and of the peak signal corresponding to the target that is not to be output by the radar apparatus, and which is derived by the FFT processing described in step S102. Then, the acquired FFT data is stored in the memory 182 as the FFT data 182*a*.

When performing the unwanted matter removing processing, the signal processing unit 18 reads out the FFT data 182*a* from the memory 182 and determines whether the specific peak signal exists in the UP and DOWN sections by using the FFT data of the first and second sections. Like this, the signal processing unit determines whether a ghost peak exists by using the FFT data of the first frequency region, which is used to derive the target information, and the FFT data of the second region, which has been deleted until now so as to secure the storage capacity of the memory since it is not used to derive the target information, and performs the unwanted matter removing processing of removing the target information corresponding to the ghost peak, so that it is possible to effectively utilize the FFT data of all the frequency regions derived in the FFT processing.

Also, the switching noise of the DC-DC converter, which is one occurrence cause of the ghost peak, exists at the frequency 1023 BIN of the second region. Thus, while the signal processing unit 18 cannot determine whether the selected peak signal is the peak single of the ghost only with the data of the first region of the FFT data, the signal processing unit can correctly determine whether the selected peak signal is the ghost peak by using the data of the second region together with the data of the first region.

Also, on the assumption that one transmission period (for example, time t0 to t2) in which the transmission wave is output from the transmission antenna 13*a* and another transmission period (for example, time t2 to t4) in which the transmission wave is output from the transmission antenna 13*b* have the different beam patterns (the beam pattern NA and the beam pattern NB) of the respective transmission waves, the signal processing unit 18 acquires the FFT data of the first region (0 to 700 BIN) in the plurality of periods corresponding to the one transmission period and another transmission period. Also, the signal processing unit 18 acquires the FFT data of the first region and second region (701 to 1023 BIN) corresponding to any one of the one transmission period and another transmission period.

With respect to the FFT data of the first region only, which is used to derive not only the longitudinal distance and relative speed of the target but also the angle of the target, it is desirable to acquire the information (reception signal RX) of the reflected wave for the plurality of transmission periods having different transmission wave beam patterns so that the angle of the target can be correctly derived even when the phase fold-back occurs. In contrast, the FFT data of the first and second regions are used to determine the ghost peak. That is, since the angle of the target is not derived using the FFT data of the first and second regions, it is enough to acquire the information of just one transmission period corresponding to one beam pattern. As a result, in comparison to the configuration where the FFT data of the first and second regions is acquired for the plurality of transmission periods, it is possible to reduce the storage capacity of the memory 182.

Also, the transmission period for which the signal processing unit 18 acquires the FFT data of the first and second regions is a half cycle of the one transmission period of the transmission signal TX of the first half UP and DOWN sections, for example, as described above. Like this, the acquisition period of the FFT data of the first and second regions, which is acquired for the signal processing unit 18 to perform the unwanted matter removing processing, is made to be the half cycle of the one transmission period of the transmission signal TX. Thereby, compared to the configuration where the acquisition period of the FFT data of the first and second regions is one cycle of the transmission signal TX, it is possible to reduce the storage capacity of the memory 182. Also, since the frequency information and reception level information of the peak signal are used for the ghost determination and the phase information is not necessary, the reception antenna for which the FFT data of the first and second regions is stored can be one of the four antennae. Thereby, it is possible to further reduce the storage capacity of the memory 182.

<Second Illustrative Embodiment>

In the below, a second illustrative embodiment is described. The signal processing unit 18 of the radar apparatus 1 of the second illustrative embodiment adds new processing to the unwanted matter removing processing, which has been described with reference to FIG. 8 of the first illustrative embodiment, so as to perform the ghost determination more correctly.

The configuration and processing of the radar apparatus 1 of the second illustrative embodiment are substantially the same as the first illustrative embodiment. However, a part of the unwanted matter removing processing is different. In the below, the difference is described with reference to FIGS. 10 to 13.

<3. Processing Flow Chart>

Figure 10:
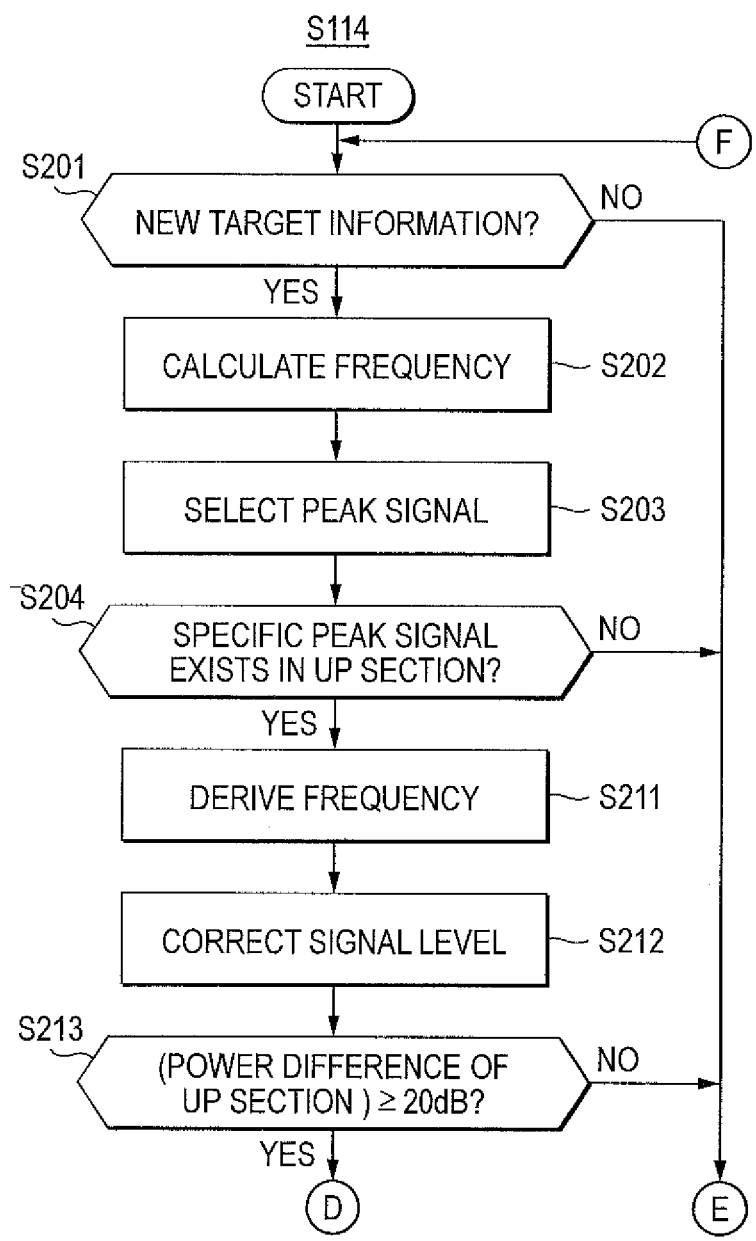
FIG. 10 is a flow chart showing target information removing processing of a ghost peak according to a second illustrative embodiment.
Figure 11:
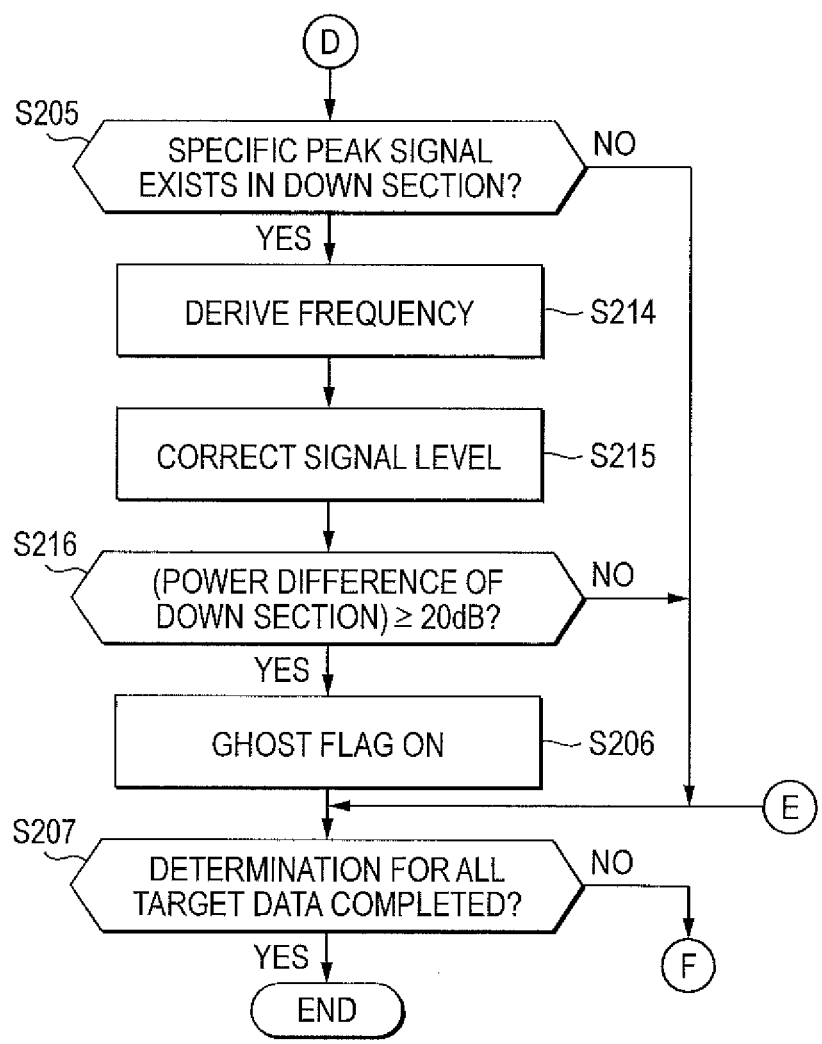
FIG. 11 is a flow chart showing the target information removing processing of a ghost peak according to the second illustrative embodiment.

FIGS. 10 and 11 are flow charts showing the target information removing processing of the ghost peak according to the second illustrative embodiment. Also, FIG. 12 shows FFT data FT2 of the second illustrative embodiment and FIG. 13 shows a filter characteristic of the LPF 16 and a correction ratio of the signal level value.

In FIG. 10, the signal processing unit 18 performs the processing of steps S201 to S203. When the specific peak signal exists in the first half UP section (Yes in step S204), the signal processing unit derives a frequency obtained by folding back the frequency of the specific peak signal based on the Nyquist frequency F2 of the predetermined frequency (1023 BIN) (step S211). Then, the signal processing unit 18 performs signal level correction processing of multiplying the signal level value of the specific peak signal by predetermined times, in accordance with the derived frequency (step S212). Then, when the selected peak signal and the signal level value of the specific peak signal after the correction satisfy a predetermined relation (for example, a difference between both the peak signal level values is 20 dB or larger) (Yes in step S213), the signal processing unit 18 performs processing of step S205 shown in FIG. 11.

Here, the derivation of the folded back frequency based on the Nyquist frequency F2 in the FFT data of the first half UP section and the signal level correction of the specific peak signal are specifically described with reference to FIGS. 12 and 13. The FFT data FT2 shown in FIG. 12 (hereinafter, referred to as 'data FT2') is FFT data of the first half UP section (time t0 to t11) having a horizontal axis of a frequency axis (unit: BIN) and a vertical axis of a signal level value (unit: dB) and is data including the frequency regions of the first and second regions on the horizontal axis.

Figure 12:
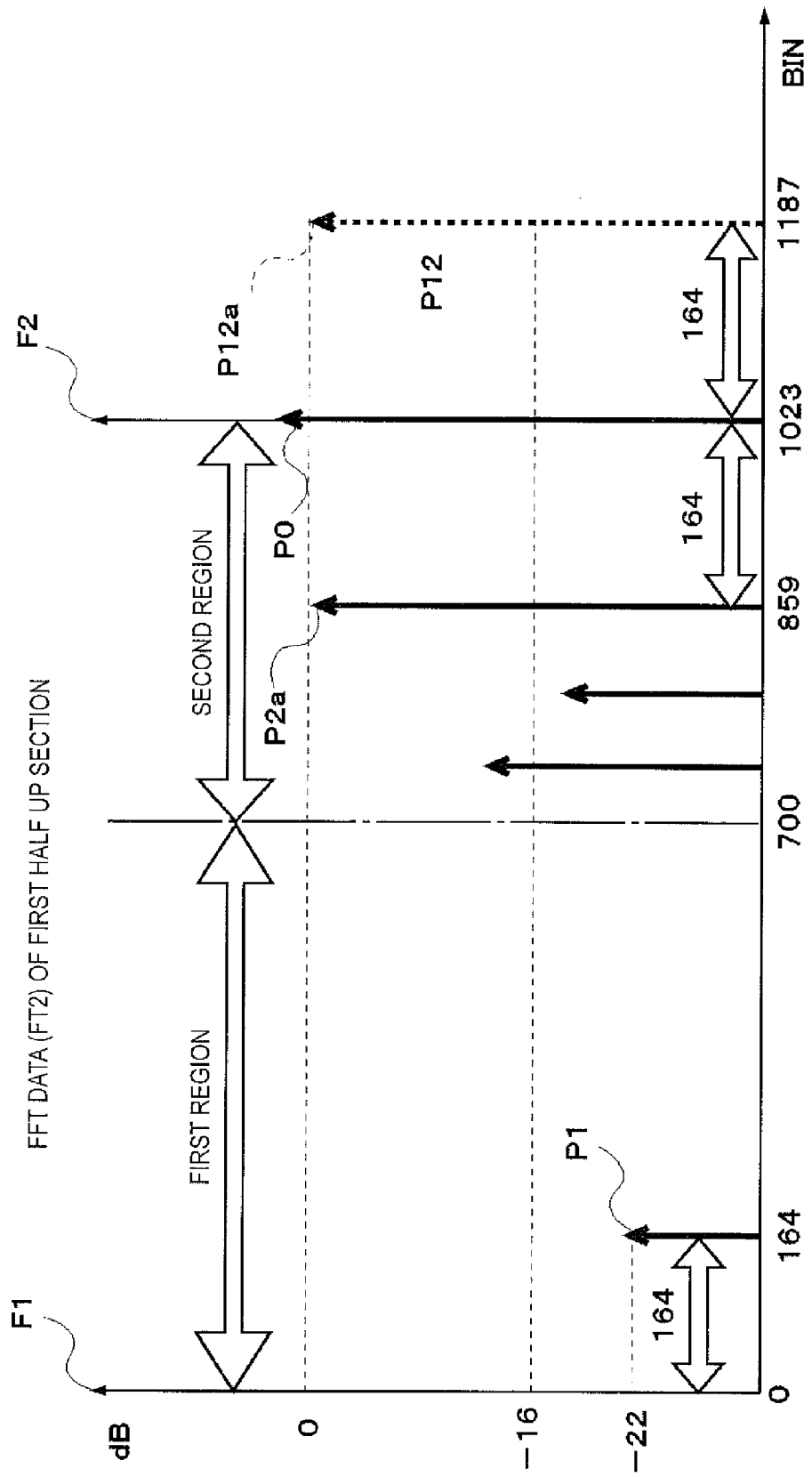
FIG. 12 shows FFT data of the second illustrative embodiment.
Figure 13:
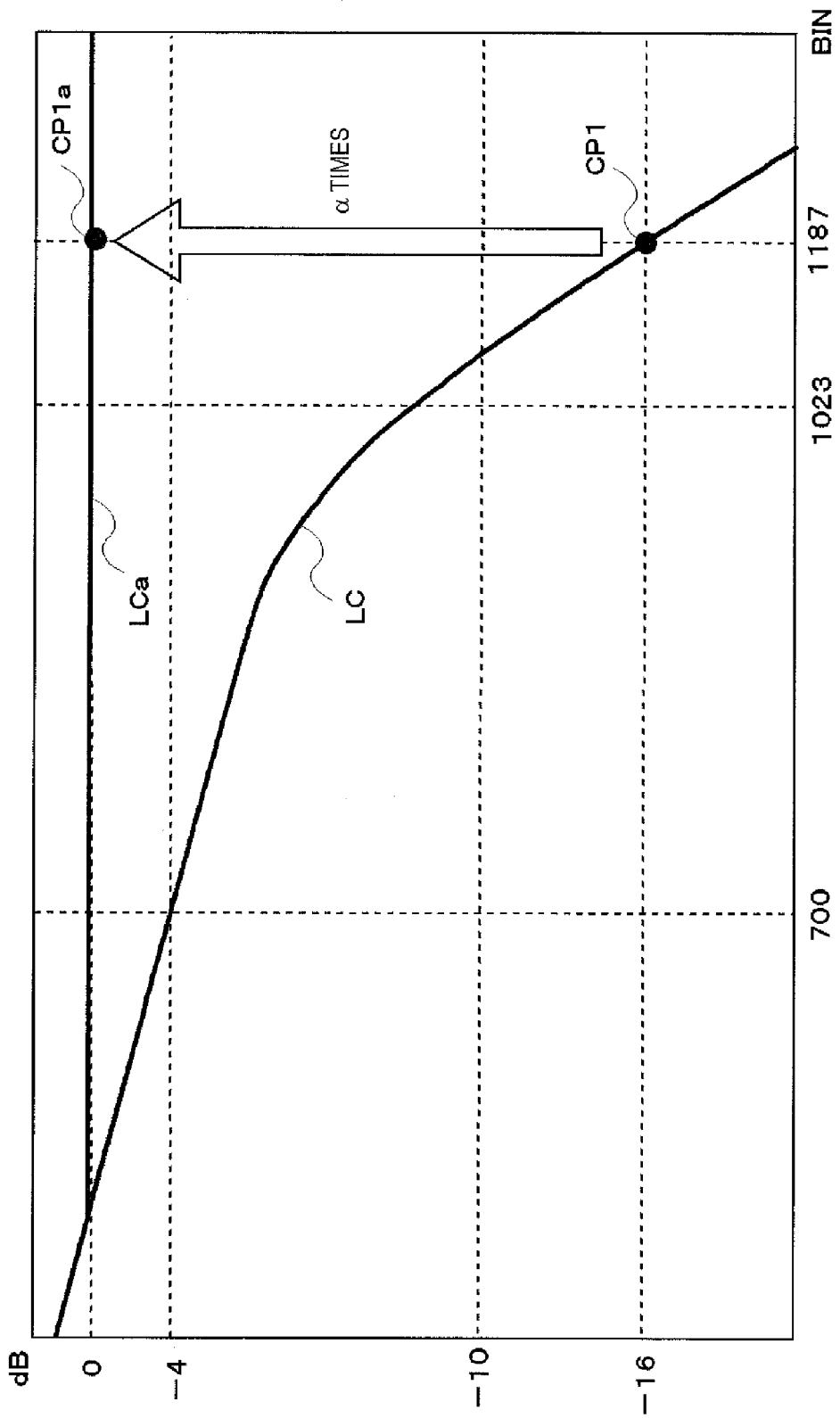
FIG. 13 is a view showing a filter characteristic of an LPF and a correction ratio of a signal level value.

In FIG. 12, since the specific peak signal P2 exists at the frequency 859 BIN in the range including the frequency (1023 BIN−164 BIN=859 BIN), which is separated from the frequency of the peak signal P0 existing at the frequency 1023 BIN corresponding to the frequency of the switching noise of the DC-DC converter by the frequency 164 BIN of the selected peak signal, and a vicinity (for example, 859 BIN±1 BIN) of the frequency, the signal processing unit 18 determines that the specific peak signal P2 exists (which corresponds to Yes in step S204).

Then, the signal processing unit 18 derives the frequency (1023 BIN−859 BIN=164 BIN, 1023 BIN+164BIN=1187 BIN) obtained by folding back the specific peak signal P2 with respect to the Nyquist frequency (1023 BIN) (which corresponds to step S211). Then, the signal processing unit 18 multiplies the signal level of the specific peak signal P2 by predetermined times, in accordance with a correction ratio of the signal level value corresponding to the folded back frequency 1187 BIN (which corresponds to step S212).

In the filter characteristic diagram of FIG. 13 (the horizontal axis: frequency [unit: BIN], the vertical axis: signal level value [unit: dB]), a level line LC is shown which indicates the signal level values of the respective frequencies BIN of the beat signal when the LPF 16 filters the beat signal BS. The signal level value of the frequency 1187 BIN, which is the frequency obtained by folding back the frequency of the specific peak signal P2 on the basis of the Nyquist frequency, is −16 dB of a point CP1 on the level line LC.

Then, the signal processing unit 18 performs correction of multiplying the signal level value of the specific peak signal P2 by predetermined times by a multiplying factor (α times), which increases the level value of −16 dB of 1187 BIN to 0 dB of a point CP1 a on a level line LCa after correction indicative of a level value after correcting a signal level value. As a result, as shown in FIG. 12, the signal level value (−16 dB) of the specific peak signal P2 before correction becomes the signal level value (0 dB) of the specific peak signal P2 a after correction.

Then, as shown in FIG. 12, since a difference between the signal level value (−22 dB) of the selected peak signal and the signal level value (0 dB) of the specific peak signal P2 a after correction is 20 dB or larger (22 dB) (which corresponds to Yes in step S213), the signal processing unit 18 proceeds to step S205 which is next processing.

Returning back to FIG. 11, when the specific peak signal exists in the FFT data of the first half DOWN section in the processing of step S205 (Yes in step S205), the signal processing unit 18 performs the correction of multiplying the signal level of the specific peak signal by predetermined times, in accordance with a correction ratio of the signal level value corresponding to the frequency obtained by folding back the frequency of the specific peak signal with respect to the Nyquist frequency F2, in steps S214 to S216, like the UP section.

Then, when the signal level value of the selected peak signal and the signal level value of the specific peak signal after correction meet a predetermined relation, the signal processing unit 18 performs the processing of step S206. That is, the signal processing unit 18 turns on the ghost flag with respect to the selected target information. The target information having the ghost flag made to be on is excluded from the output object that is to be output from the radar apparatus 1 to the vehicle control device 2.

That is, when the selected peak signal is a ghost signal, the level of the peak signal P12 of the strong reflector, which is an occurrence cause of the ghost signal and actually exists, is largely lowered by the LPF 16. Therefore, the level of the selected peak signal P1 occurring as the ghost peak is also reduced. In contrast, when the selected peak signal is a peak signal corresponding to a target actually existing, the level thereof is not lowered by the LPF 16. Thereby, when the selected peak signal is a peak signal corresponding to a target actually existing, it has a larger signal level value, compared to the ghost peak, so that the corresponding signal is not determined as a ghost signal. When the signal level value of the selected peak signal and the signal level value of the specific peak signal after correction meet a predetermined relation, the target information corresponding to the selected peak signal is excluded from the output object of the radar apparatus. Thereby, it is possible to specify whether the peak signal is a ghost peak or not more correctly.

Meanwhile, in steps S2123 and S216, when the signal level value of the selected peak signal and the signal level value of the specific peak signal after correction do not meet a predetermined relation (for example, a difference between both signal levels is smaller than 20 dB) (No in step S213, No in step S216), the signal processing unit 18 performs the processing of step S207 described in the first illustrative embodiment.

<Third Illustrative Embodiment>

In the below, a third illustrative embodiment is described. The signal processing unit 18 of the radar apparatus 1 of the third illustrative embodiment adds processing, which is performed when the target information having temporal continuity with respect to the target information having the ghost flag made to be on in the previous time processing is derived in this time processing, to the unwanted matter removing processing, which has been described with reference to FIG. 8 of the first illustrative embodiment.

The configuration and processing of the radar apparatus 1 of the third illustrative embodiment are substantially the same as the first illustrative embodiment. However, a part of the unwanted matter removing processing is different. In the below, the difference is described with reference to FIGS. 14 and 15.

<4. Processing Flow Chart>

Figure 14:
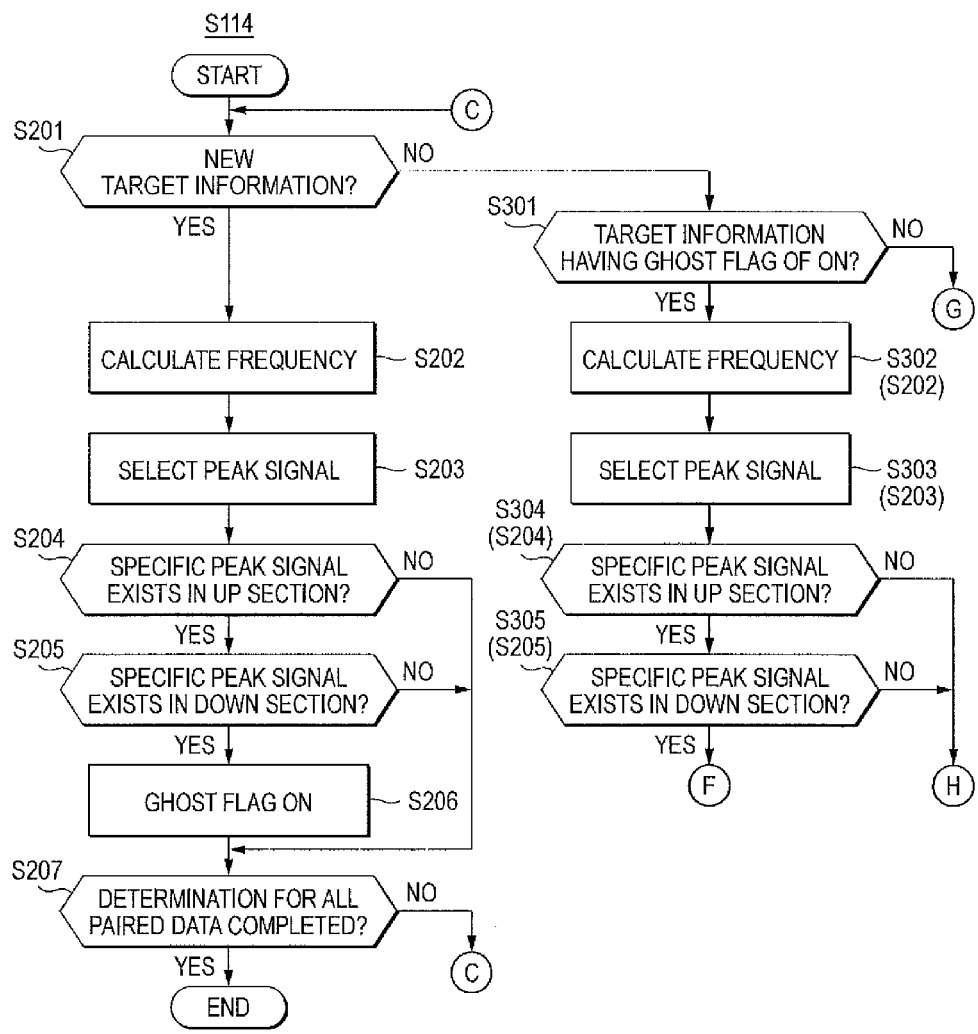
FIG. 14 is a flow chart showing target information removing processing of a ghost peak according to a third illustrative embodiment.
Figure 15:
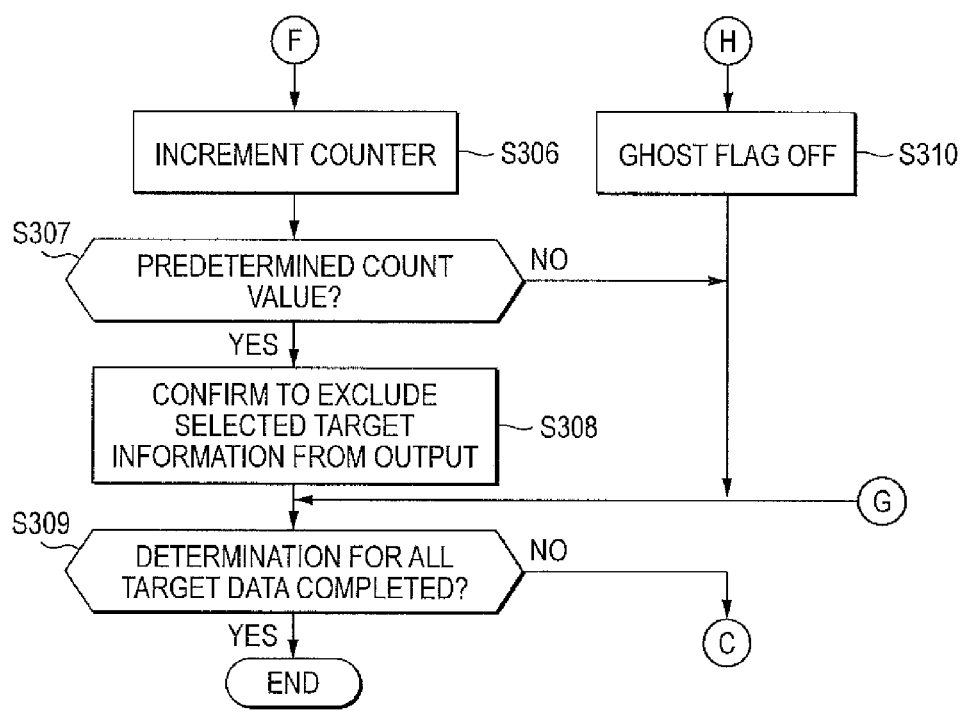
FIG. 15 is a flow chart showing the target information removing processing of a ghost peak according to the third illustrative embodiment.

FIGS. 14 and 15 are flow charts showing the target information removing processing of the ghost peak according to the third illustrative embodiment. In this time target derivation processing, the signal processing unit 18 determines any one of the past correspondence paired data and the new paired data in the continuity determination processing of step S108 shown in FIG. 6 and selects one of the plurality of the target information filtered in the filtering processing of step S110. Then, the signal processing unit 18 determines whether the selected target information is the new target information (step S201). When the selected target information is the new target information (Yes in step S201), the signal processing unit 18 performs the processing described in the first illustrative embodiment.

When the selected target information is not the new target information (No in step S201), the signal processing unit 18 performs processing of the third illustrative embodiment. That is, the signal processing unit 18 determines whether the selected target information of this time processing is target information having the temporal continuity with respect to the target information having the ghost flag made to be ON in the previous time processing (step S301). When the selected target information of this time processing is target information having the temporal continuity with respect to the target information having the ghost flag made to be ON in the previous time processing (Yes in step S301), the signal processing unit 18 performs processing of steps S301 to 305.

On the other hand, when the selected target information of this time processing is target information having the temporal continuity with respect to the target information having the ghost flag made to be OFF in the previous time processing (No in step S301), the signal processing unit 18 performs processing of step S309 shown in FIG. 15. That is, the signal processing unit 18 determines whether the unwanted matter removing processing is performed for all the target information (step S309), like the processing of step S207 of FIG. 8 described in the first illustrative embodiment. When the unwanted matter removing processing is performed for all the target information (Yes in step S309), the signal processing unit ends the unwanted matter removing processing and performs next combining processing (step S115). On the other hand, when the unwanted matter removing processing is not performed for all the target information (No in step S309), the signal processing unit returns to the processing of step S201 and performs the unwanted matter removing processing for target information for which the unwanted matter removing processing has not been performed yet.

Returning back to FIG. 14, the processing of steps S302 to S305 is the same as that of steps S202 to S205 (steps S202 to S205 shown in FIG. 14) described in FIG. 8 of the first illustrative embodiment. That is, in the processing of steps S302 to S305, the signal processing unit 18 determines whether the selected target information of this time processing having the temporal continuity with respect to the target information having the ghost flat made to be ON in the previous time processing meets a condition of enabling the ghost flag to be ON. When the condition is satisfied (Yes in step S305), the signal processing unit performs processing of step S306 shown in FIG. 15. On the other hand, when the condition of enabling the ghost flag to be ON is not satisfied (No in step S304 or No in step S305), the signal processing unit 18 performs processing of step S310.

Then, in processing of step S306 shown in FIG. 15, the signal processing unit 18 performs processing of incrementing a counter in accordance with the number of times that the target information meets a condition of enabling the ghost flag to be ON after the ghost flag first becomes ON (step S306).

Then, the signal processing unit 18 determines whether the counter has a predetermined count value (for example, a count value of 3) (step S307). When the count value is 3 (Yes in step S307), the signal processing unit 18 confirms that the selected target information is excluded from the output object from the radar apparatus 1 to the vehicle control device 1 (step S308). Like this, regarding the target information having the ghost flag made to be ON in the one time target derivation processing, when it is determined in the target derivation processing to be performed several times thereafter that the target information having the temporal continuity meets all the conditions enabling the ghost target information to be determined and the ghost flag is thus determined as an ON state, the counter is incremented. Then, for example, after the ghost flag becomes ON, when the condition of enabling the ghost flag to be ON is satisfied in the consecutive target derivation processing of three times, it is confirmed that the selected target information is excluded from the output object.

On the other hand, in processing of step S310, when it is determined in the subsequent target derivation processing of the predetermined number of times (for example, three times) including this time processing that there is no specific peak signal corresponding to the same target information as the target information having the ghost flag made to be ON in the previous time processing and excluded from the output object (No in step S304 or No in step S305), the ghost flag of the selected target information becomes OFF and the selected target information becomes an output object of the radar apparatus 1. Like this, it is determined whether the target information excluded from the output object in the one time processing is the target information corresponding to the peak signal of the ghost, in the subsequent processing by the predetermined number of times. When the determination condition is not satisfied, the corresponding target information is set as the output object. Thereby, it is possible to prevent a situation where a target actually existing is regarded as a target corresponding to the peak signal of the ghost and is thus erroneously excluded from the output object. After the processing of step S310, the signal processing unit 18 performs the processing of step S309.

<Fourth Illustrative Embodiment>

In the below, a fourth illustrative embodiment is described. The signal processing unit 18 of the radar apparatus 1 of the fourth illustrative embodiment adds processing, which is performed when the target information having temporal continuity is derived in this time processing with respect to the target information having the ghost flag made to be ON in the previous time processing described in the third illustrative embodiment, to the unwanted matter removing processing, which has been described with reference to FIGS. 10 and 11 of the second illustrative embodiment.

The configuration and processing of the radar apparatus 1 of the fourth illustrative embodiment are substantially the same as the second and third illustrative embodiments. However, a part of the unwanted matter removing processing is different. In the below, the difference is described with reference to FIGS. 16 to 18.

<5. Processing Flow Chart>

Figure 16:
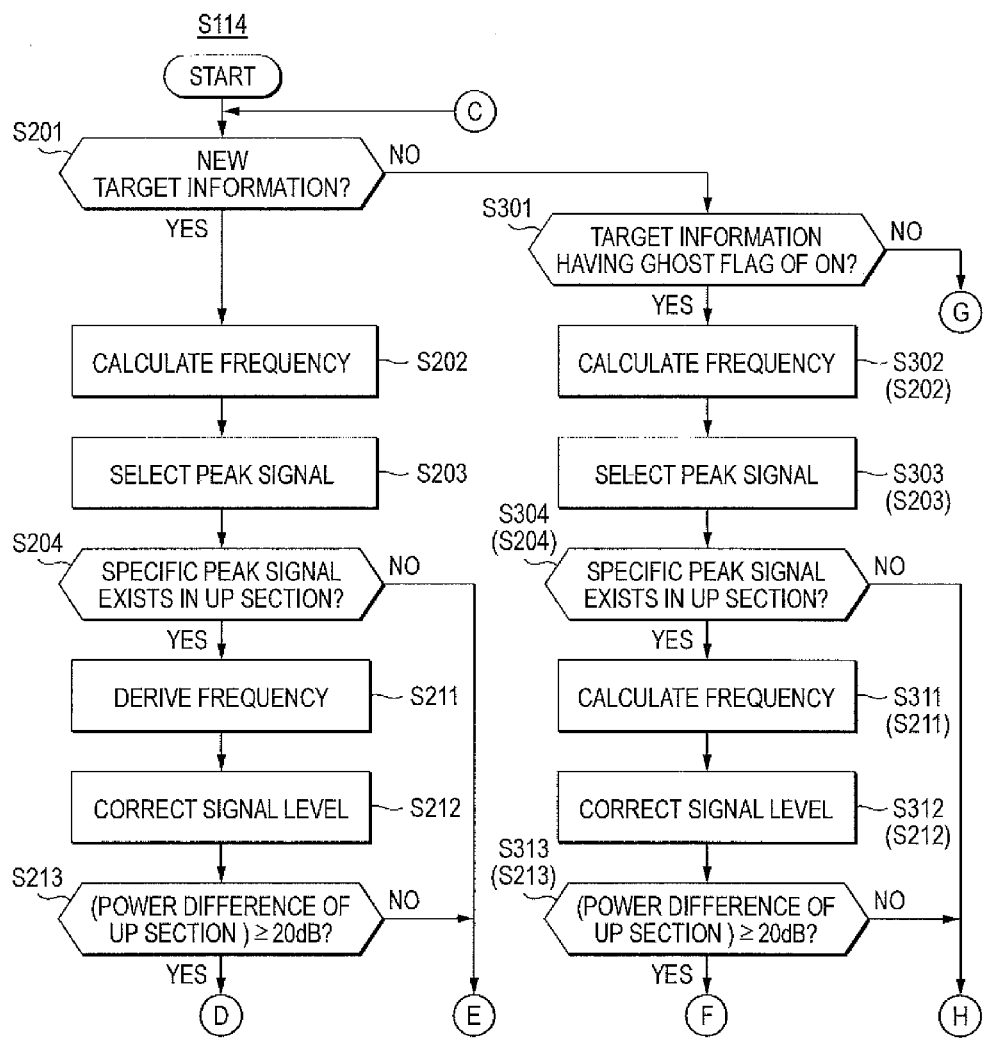
FIG. 16 is a flow chart showing target information removing processing of a ghost peak according to a fourth illustrative embodiment.
Figure 17:
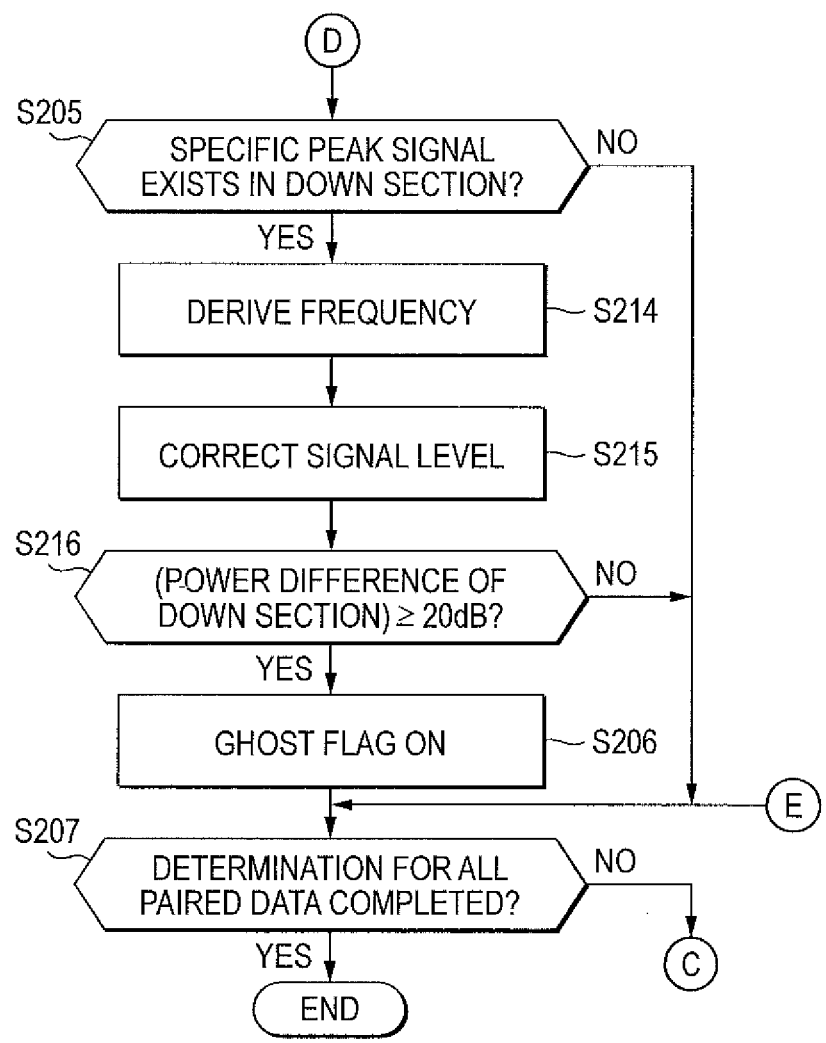
FIG. 17 is a flow chart showing the target information removing processing of a ghost peak according to the fourth illustrative embodiment.
Figure 18:
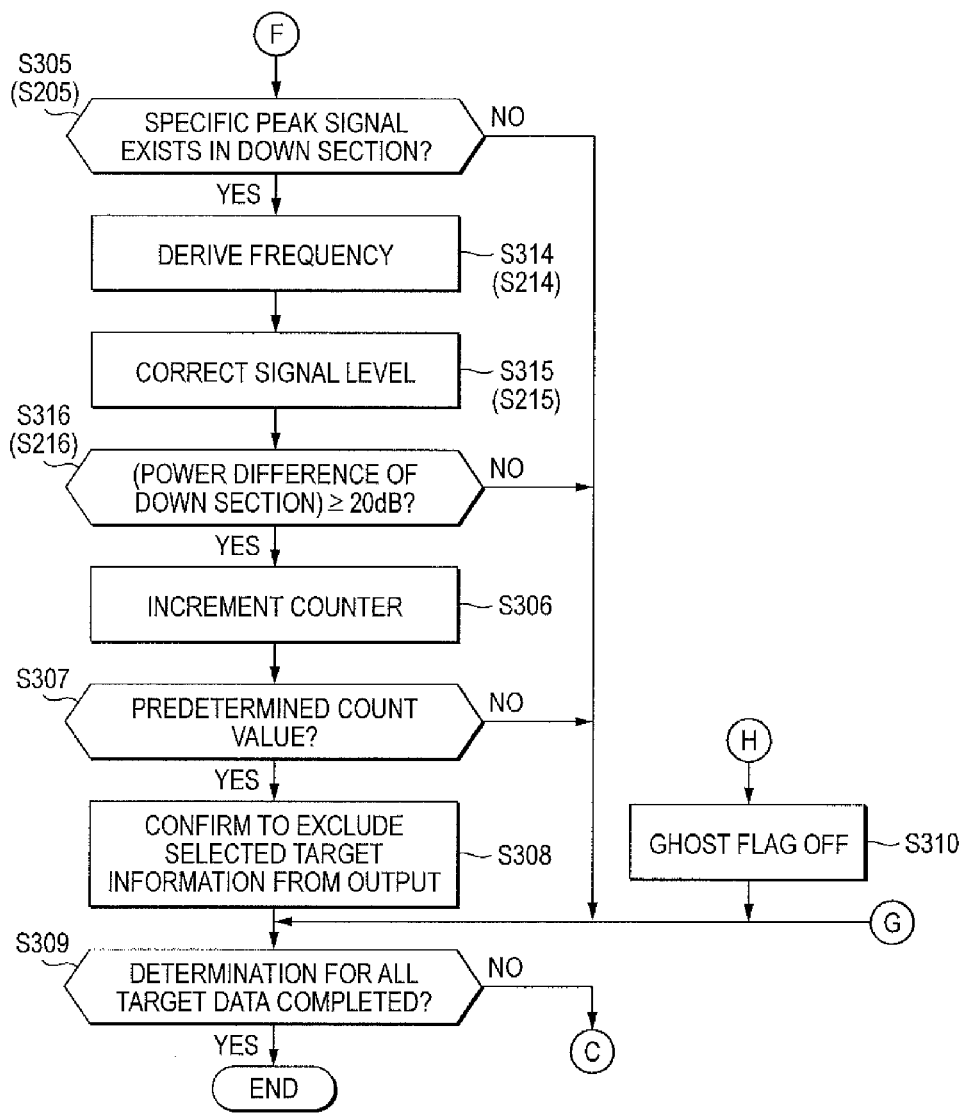
FIG. 18 is a flow chart showing the target information removing processing of a ghost peak according to the fourth illustrative embodiment.

FIGS. 16 to 18 are flow charts showing the target information removing processing of the ghost peak according to the fourth illustrative embodiment. In these flow charts, regarding FIGS. 14 and 15 of the flow charts of the third illustrative embodiment, when the specific peak signal exists in the first half UP section in step S204 described in the second illustrative embodiment (Yes in step S204), the processing of steps S211 to S213 is added, and when the specific peak signal exists in the first half DOWN section in step S205 (Yes in step S205), the processing of steps S214 to S216 is added.

Specifically, when the specific peak signal exists in the first half UP section in step S304 shown in FIG. 16 (Yes in step S304), processing of steps S311 to S313, which is the same as the processing of steps S211 to S213, is performed. Also, when the specific peak signal exists in the first half DOWN section in step S305 shown in FIG. 18 (Yes in step S305), processing of steps S314 to S316, which is the same as the processing of steps S214 to S216, is subsequently performed. Thereby, it is possible to determine whether the target information is the ghost target information from the information on the frequency and signal level of the selected peak configuring the selected target information. Then, the determination is further performed several times by the consecutive target derivation processing. Thereby, it is possible to determine whether the target information is the ghost target information more correctly, to securely exclude the ghost target information from the output object of the radar apparatus 1 and to set the target information, which is not a ghost and should be thus output, as the output object of the radar apparatus 1.

In the meantime, the processing of steps S201 to S204 and steps S211 to S213 shown in FIG. 16 is the same as the processing described in the flow chart of FIG. 10 and the processing of steps S205 and S206 and steps S214 to S216 shown in FIG. 17 is the same as the processing described in the flow chart of FIG. 11.

Although the illustrative embodiments of the invention have been described, the invention is not limited to the illustrative embodiments and can be variously modified. In the below, modified embodiments are described. In the meantime, all forms including the forms described in the illustrative embodiments and forms to be described in the below can be appropriately combined.

In the above illustrative embodiments, the unwanted matter removing processing is performed for the FFT data of the first half UP section (time t0 to t11) of the first cycle and the FFT data of the first half DOWN section (time t1 to t12). However, the unwanted matter removing processing may be performed for the FFT data in the other sections. For example, the unwanted matter removing processing may be performed for the FFT data of the latter half UP section (time t11 to t1) of the first cycle and the FFT data of the latter half DOWN section (time t12 to t2). Also, the unwanted matter removing processing may be performed for the FFT data of the first half and latter half of each section of the second cycle and further for the FFT data of a section combining the first half and latter half of each section.

Also, in the above illustrative embodiments, the unwanted matter removing processing of step S114 is performed after the target information is derived, and when the selected peak signal is the ghost peak, the selected target information corresponding to the selected peak signal is excluded from the output object of the radar apparatus 1 and is removed. In addition to this, after the FFT processing of step S102 is performed, it may be determined that the selected peak signal is a ghost peak before the target information is derived in this time processing, and when it is determined that the selected peak signal is a ghost peak, the selected peak may be removed.

Also, in the above illustrative embodiments, the frequency of the peak signal P0 corresponding to the switching frequency of the DC-DC converter is 1023 BIN that is the same as the Nyquist frequency F2. However, when the switching frequency is changed, the frequency of the peak signal P0 is correspondingly changed. Therefore, the frequency of the peak signal P0 may be a frequency other than 1023 BIN. In this case, the positional relation and the frequency difference of the peak signal P0, the peak signal P12 of the strong reflector, the Nyquist frequency F2, the folded back specific peak signal P2 and the selected peak signal P1 becoming a ghost (refer to FIG. 9) are changed. However, the ghost determination may be performed by the same method. In this case, although the difference frequency $\Delta F$ between the peak signal P0 of the noise and the folded back specific peak signal P2 of the peak signal P12 of the strong reflector does not coincide with a frequency Fp1 of the selected peak signal P1, when a relation of $\Delta F$ and Fp1 has the above described ghost relation, it corresponds to a case where the 'specific peak signal exists at a frequency that is distant by a frequency of the selected peak signal'.

Also, in the second illustrative embodiment, regarding the description that the signal level value of the selected peak signal and the signal level value of the specific peak signal after correction meet the predetermined relation, the predetermined relation is that a difference between the signal level value of the selected peak signal and the signal level value of the specific peak signal after correction is 20 dB or larger. However, in addition to this, the predetermined relation may include a relation capable of specifying a relation of both signal level values, such as a case where a ratio of both signal level values has a relation of a predetermined ratio or larger and a case where both signal level values have a relation of predetermined times or more.

Also, in the above illustrative embodiments, the angle direction is estimated using the ESPRIT. In addition to this, any one algorithm of a DBF (Digital BeamForming), a PRISM (Propagator method based on an Improved Spatial-smoothing Matrix) and MUSIC (Multiple Signal Classification) may be used.

Also, in the above illustrative embodiments, the radar apparatus 1 may be used for other utilities (for example, a utility for monitoring an airplane while in-flight or a ship under way) in addition to the vehicle mounting.

What is claimed is:

1. A radar apparatus configured to emit a transmission wave relating to a transmission signal to be frequency-modulated, to receive a reflected wave coming from a target at which the transmission wave is reflected as a reception signal, and to derive target information including at least position information of the target from peak signals which are extracted by performing FFT processing for a beat signal that is generated from the reception signal, the radar apparatus comprising:
   a determination unit configured to determine whether a specific peak signal exists at a frequency that is distant from a frequency of the peak signal existing at a first frequency by a frequency of one selected peak signal selected from the plurality of peak signals, and
   an exclusion unit configured to exclude the target information corresponding to the selected peak signal from an output object of the radar apparatus when the specific peak signal exists.

2. The radar apparatus according to claim 1, further comprising a correction unit configured to multiply a signal level value of the specific peak signal by predetermined times in accordance with a frequency obtained by folding back the frequency of the specific peak signal with respect to a second frequency of a predetermined frequency,
   wherein the exclusion unit excludes the target information corresponding to the selected peak signal from the output object of the radar apparatus when a signal level value of the selected peak signal and a signal level value of the specific peak signal after correction meet a predetermined relation.

3. The radar apparatus according to claim 1, further comprising an acquisition unit configured to acquire FFT data having signal level values of the beat signal of a first region which is a frequency region including a frequency up to an upper limit frequency of a peak signal corresponding to a target becoming the output object of the radar apparatus, and in a second region which is a frequency region including a frequency higher than the upper limit frequency and of a peak signal corresponding to a target excluded from the output object of the radar apparatus, and being derived by the FFT processing,
   wherein the determination unit determines whether the specific peak signal exists by using the FFT data.

4. The radar apparatus according to claim 3, wherein the first frequency is a frequency of the second region.

5. The radar apparatus according to claim 3,
   wherein the transmission wave is output with beam patterns that are different in one transmission period and another transmission period, and
   wherein the acquisition unit acquires the FFT data of only the first region in a plurality of periods corresponding to the one transmission period and the another transmission period and the FFT data corresponding to one of the one transmission period and the another transmission period.

6. The radar apparatus according to claim 5, wherein the acquisition unit acquires the FFT data of a half cycle of one of the one transmission period and the another transmission period.

7. The radar apparatus according to claim 1, wherein when the determination unit determines in subsequent processing of a predetermined number of times including this time processing that no specific peak signal corresponding to the same target as the target excluded from the output object in previous time processing exists, the exclusion unit sets the target information corresponding to the selected peak signal as the output object of the radar apparatus.

8. A signal processing method in a radar apparatus, the method comprising the steps of:
   emitting a transmission wave relating to a transmission signal to be frequency-modulated,
   receiving a reflected wave coming from a target at which the transmission wave is reflected as a reception signal, and
   deriving target information including at least position information of the target from peak signals which are extracted by performing FFT processing for a beat signal that is generated from the reception signal, the signal processing method further comprising:
   determining from a frequency of the peak signal existing at a first frequency whether a specific peak signal exists at a frequency that is distant by a frequency of one selected peak signal selected from the plurality of peak signals, and
   when the specific peak signal exists, excluding the target information corresponding to the selected peak signal from an output object of the radar apparatus.

* * * * *